(12) United States Patent
Shuai et al.

(10) Patent No.: US 11,841,072 B2
(45) Date of Patent: Dec. 12, 2023

(54) TRANSVERSE CYCLOIDAL-PIN GEAR PAIR AND NUTATION DECELERATION DEVICE

(71) Applicant: Beijing Intelligent Daai Robot Technology Co., Ltd., Beijing (CN)

(72) Inventors: Mei Shuai, Beijing (CN); Xiaochun Wang, Beijing (CN)

(73) Assignee: BEIJING INTELLIGENT DAAI ROBOT TECHNOLOGY CO., LTD., Beijing (CN)

( * ) Notice: Subject to any disclaimer, the term of this patent is extended or adjusted under 35 U.S.C. 154(b) by 406 days.

(21) Appl. No.: 17/266,862

(22) PCT Filed: Jul. 24, 2019

(86) PCT No.: PCT/CN2019/097517
§ 371 (c)(1),
(2) Date: Feb. 8, 2021

(87) PCT Pub. No.: WO2020/034816
PCT Pub. Date: Feb. 20, 2020

(65) Prior Publication Data
US 2021/0310552 A1    Oct. 7, 2021

(30) Foreign Application Priority Data

Aug. 17, 2018  (CN) .......................... 201810942688.3
Jul. 1, 2019    (CN) .......................... 201910591871.8

(51) Int. Cl.
*F16H 55/08*        (2006.01)
*F16H 55/17*        (2006.01)

(52) U.S. Cl.
CPC ............. *F16H 55/08* (2013.01); *F16H 55/17* (2013.01); *F16H 2055/173* (2013.01)

(58) Field of Classification Search
CPC ..... F16H 55/08; F16H 55/17; F16H 2055/173
See application file for complete search history.

(56) References Cited

U.S. PATENT DOCUMENTS 9,427,866 B2 *    8/2016   Hasegawa ................ B25J 9/104
10,520,063 B2 *  12/2019   Atmur ..................... H02K 7/116
2015/0024896 A1   1/2015   Takahashi et al.

FOREIGN PATENT DOCUMENTS

CN        85109356 A      7/1987
CN       102594016 A      7/2012
(Continued)

OTHER PUBLICATIONS

Translation CN 114198464.*

(Continued)

*Primary Examiner* — Terence Boes

(74) *Attorney, Agent, or Firm* — Muncy, Geissler, Olds & Lowe, P.C.

(57) ABSTRACT

A transverse cycloid-pin gear pair includes a cycloidal gear with a cycloidal tooth flank and a pin gear with a pin tooth flank, the pin gear meshing with the cycloidal gear in a nutation transmission manner. Angles between reference surfaces of the pin gear and the cycloidal gear and corresponding axes are between 88° and 91°, and a sum of the two angles is less than 180°. Portions of the pin tooth flank and the cycloidal tooth flank are pin gear working flank and cycloidal gear working flank, respectively. A pressure angle between the pin gear working flank and the cycloidal gear working flank when meshing satisfies $45°-\beta-5° \leq \alpha \leq 45°-\beta+5°$, where $\alpha$ is the pressure angle, $\beta$ is a friction angle. A nutation deceleration device comprises a shell, a transverse cycloidal-pin gear pair, an input mechanism, an output mechanism, and a torque transfer component.

21 Claims, 22 Drawing Sheets

(56) References Cited

FOREIGN PATENT DOCUMENTS

| | | | |
|---|---|---|---|
| CN | 105889446 A | 8/2016 | |
| CN | 106246812 A | 12/2016 | |
| CN | 106545622 A | 3/2017 | |
| CN | 208982611 U | 6/2019 | |
| CN | 114198464 A * | 3/2022 | ........... F16H 57/023 |
| FR | 2485669 A1 | 12/1981 | |
| GB | 1136877 A | 12/1968 | |
| JP | S60-192152 A | 9/1985 | |

OTHER PUBLICATIONS

Han, Tianquan, "Research on Reducer Optimization Design Based on Nutation Drive and Prototype Development," Dissertation for the Master Degree in Mechanical Engineering, Harbin Institute of Technology School of Mechanical Engineering, Jan. 18, 2019, 114 pages.

* cited by examiner

TRANSVERSE CYCLOIDAL-PIN GEAR PAIR AND NUTATION DECELERATION DEVICE

FIELD

The invention relates to a deceleration device, and particularly to an transverse cycloidal-pin gear pair for a nutation deceleration device, and a nutation deceleration device using the same.

BACKGROUND

The nutation deceleration device is a deceleration device applied with nutation transmission. Generally, a gear pair applied in the nutation deceleration device usually perform transmission with an involute tooth profile or a cycloidal tooth profile. However, the involute tooth profile has low transmission efficiency, and also easily has issues of profile overlap interference and radial interference in a nutation structure; the cycloidal tooth profile easily has issues of overcut of the tooth profile and collision of the pin gear. A planetary decelerator having a large speed ratio has a complex structure, large difficulty in manufacturing and assembling, and a heavy mass. However, the conventional tooth profile of the gear pair is designed that only a small portion of teeth is meshing with each other at any moment during nutation transmission. For example, as for a gear having forty-five teeth, only one to two teeth are meshing with each other to participate in nutation transmission at any moment during nutation transmission. Therefore, the traditional nutation deceleration device has disadvantages of a small carrying capacity and transmission instability.

To solve the problem, the Chinese invention patent application CN106246812A discloses a bilateral two-stage internal meshing biarc bevel gear nutation deceleration device, which realizes transmission deceleration of an input shaft using transmission meshing of two biarc bevel gears coupled to the input shaft via a nutation sleeve and another two biarc bevel gears. A two-stage gear is arranged that teeth meshing in a one-stage gear and teeth meshing in another stage gear are opposite to each other at any moment during nutation transmission. The solution doubles the number of teeth meshing with each other at any moment during nutation transmission by using the two-stage gear, while improving transmission stability by configuring the two-stage gear to allow teeth meshing in the two-stage gear to be opposite to each other.

However, the above solution only doubles the number of teeth meshing during the nutation transmission, which may be far insufficient for improving the carrying capacity and transmission stability. Meanwhile, in the above solution, the two-stage gear still uses an internal bevel gear. However, the internal bevel gear is hardly manufactured in traditional mechanical machining, and machining with a CNC machine tool is high in cost. Moreover, as for machining with a method of replacing the tooth profile, although production process is simple, precision is reduced. These deficiencies become main factors for restricting development of the nutation deceleration device.

Therefore, it is desired for an improved gear pair and a nutation deceleration device using the same, which have advantages of large transmission ratio, improved transmission stability and large carrying capacity, and also can solve issue of tooth profile interference.

SUMMARY

The invention has an object to solve the deficiencies of the nutation deceleration device, and provides a novel nutation deceleration device. The deceleration device has a small nutation angle, a large transmission ratio, an improved transmission stability and a large carrying capacity, also solves issue of tooth profile interference, and has characteristics of a compact structure and convenience in manufacturing and assembling.

To realize the object, according to one aspect of the invention, provided is an transverse cycloidal-pin gear pair for a nutation deceleration device, comprising: a cycloidal gear with a cycloidal tooth flank, wherein a reference surface of the cycloidal gear and an axis of the cycloidal gear are angled at a first angle; and a pin gear meshing with the cycloidal gear in a nutation transmission manner and having a pin tooth flank, wherein a reference surface of the pin gear and an axis of the pin gear are angled at a second angle; wherein, the first angle and the second angle are both between 88° and 91°, and a sum of the first angle and the second angle is less than 180°; and wherein portions of the pin tooth flank and the cycloidal tooth flank meshing therewith are a pin gear working flank and a cycloidal gear working flank, respectively, and a pressure angle between the pin gear working flank and the cycloidal gear working flank when meshing satisfies the following relationship: $45°-\beta-5°\leq\alpha\leq 45°-\beta+5°$, where $\alpha$ is the pressure angle, and $\beta$ is a friction angle between the pin gear working flank and the cycloidal gear working flank.

According to the transverse cycloidal-pin gear pair in one or more embodiments of the invention, the pin gear working flank is a conical surface, a cone tip of the pin gear working flank is located at a center point of the reference surface of the pin tooth flank, and an axis of the pin gear working flank is on the reference surface of the pin tooth flank.

According to the transverse cycloidal-pin gear pair in one or more embodiments of the invention, the cycloidal gear working flank is an envelope of the pin gear working flank.

According to the transverse cycloidal-pin gear pair in one or more embodiments of the invention, the pin tooth flank further includes a pin gear non-working flank consisting of a plane surface and a conical surface, and the pin gear non-working flank is tangent to the pin gear working flank; and/or the cycloidal tooth flank further includes a cycloidal gear non-working flank consisting of a plane surface and a conical surface, and the cycloidal gear non-working flank is tangent to the cycloidal gear working flank.

According to another aspect of the invention, provided is a nutation deceleration device, comprising: a shell; an transverse cycloidal-pin gear pair disposed in the shell, and being the transverse cycloidal-pin gear pair according to the embodiments; an input mechanism for driving the transverse cycloidal-pin gear pair to cause a nutation motion of the transverse cycloidal-pin gear pair; an output mechanism coupled to the transverse cycloidal-pin gear pair; and a torque transfer component for transferring a torque of the transverse cycloidal-pin gear pair to the shell.

According to the nutation deceleration device in one or more embodiments of the invention, the input mechanism is configured to drive a nutation gear in the transverse cycloidal-pin gear pair, and a rotational axis of the input mechanism and an axis of the nutation gear are angled at an angle; the torque transfer component is coupled between the nutation gear and the shell to constrain the nutation gear to rotate about its axis; and the output mechanism is coupled to a non-nutation gear.

According to another aspect of the invention, provided is a nutation deceleration device, comprising: a shell; an transverse cycloidal-pin gear pair disposed in the shell, and being the transverse cycloidal-pin gear pair according to the embodiments; an input mechanism for driving the transverse cycloidal-pin gear pair to cause a nutation motion of the transverse cycloidal-pin gear pair; an output mechanism coupled to the transverse cycloidal-pin gear pair; and a torque transfer component for transferring a torque of the transverse cycloidal-pin gear pair to the output mechanism.

According to the nutation deceleration device in one or more embodiments of the invention, the input mechanism drives a nutation gear in the transverse cycloidal-pin gear pair, and a rotational axis of the input mechanism and an axis of the nutation gear are angled at an angle; a non-nutation gear in the transverse cycloidal-pin gear pair is fixed to the shell; and the output mechanism is coupled to the nutation gear via the torque transfer component.

According to the nutation deceleration device in one or more embodiments of the invention, it further comprises: a second transverse cycloidal-pin gear pair disposed in the shell, and is opposite direction to the transverse cycloidal-pin gear pair, and the second transverse cycloidal-pin gear pair being the transverse cycloidal-pin gear pair disclosed in embodiments herein; wherein, the input mechanism is configured to drive the nutation gear in the second transverse cycloidal-pin gear pair, and the rotational axis of the input mechanism and the axis of the nutation gear of the second transverse cycloidal-pin gear pair are angled at the angle; the non-nutation gear in the second transverse cycloidal-pin gear pair is fixed to the shell; and the output mechanism is coupled to the nutation gear of the second transverse cycloidal-pin gear pair via the torque transfer component.

According to the nutation deceleration device in one or more embodiments of the invention, the input mechanism has a nutation step formed by being recessed into a sidewall of the input mechanism, wherein, the nutation step is located at a position where the input shaft is coupled to the nutation gear via a bearing, and a step surface of the nutation step and the rotational axis of the input mechanism are angled at the angle.

According to the nutation deceleration device in one or more embodiments of the invention, a sidewall of an input shaft of the input mechanism is provided with a flange radially extending outwardly, and the flange has a thickness in a direction of the rotational axis of the input mechanism; wherein, the thickness is linearly decreased from a first thickness to a second thickness less than the first thickness along a circumferential direction of the input shaft between 0° and 180°; and the thickness is linearly increased from the second thickness to the first thickness along the circumferential direction of the input shaft between 180° and 360°; and one side of the nutation gear far away from a tooth flank abuts against a transverse of the flange.

According to the nutation deceleration device in one or more embodiments of the invention, the torque transfer component is a flexible component or a constant speed transmission component.

The invention further provides a joint for a robot, comprising: a joint shell for defining a joint cavity; a nutation deceleration device accommodated in the joint shell, and being the nutation deceleration device disclosed in embodiments herein; an output shaft coupled to an output mechanism of the nutation deceleration device; and a motor accommodated in the joint shell, and coupled to an input mechanism of the nutation deceleration device.

According to the joint in one or more embodiments of the invention, it further comprises a semilunar bearing between the motor and the joint shell, and between the nutation deceleration device and the joint shell.

The invention further provides a double swing angle milling head for a machine tool, comprising: a first shell having a first motor disposed in the first shell; a second shell having a second motor disposed in the second shell; a first nutation deceleration device disposed in the first shell, an input mechanism of the first nutation deceleration device coupled to the first motor, and an output mechanism of the first nutation deceleration device coupled to the second shell to drive the second shell to rotate about a first axis; a second nutation deceleration device disposed in the second shell, and an input mechanism of the second nutation deceleration device coupled to the second motor; and a milling head coupled to an output mechanism of the second nutation deceleration device to drive the milling head to rotate about a second axis; wherein the first and second nutation deceleration devices are the nutation deceleration device disclosed in embodiments herein, and the first axis is perpendicular to the second axis.

The invention further provides a double swing angle operating table for a machine tool, comprising: a bottom base; a rotary table shell disposed on the bottom base and supported by the bottom base, wherein the rotary table shell is coupled to a first motor driving the rotary table shell to rotate about a first axis; at least one operating table disposed on the rotary table shell; and at least one nutation deceleration device disposed in the rotary table shell, and being the nutation deceleration device disclosed in embodiments herein, an input mechanism of each of the at least one nutation deceleration device coupled to a corresponding second motor, and an output mechanism of each of the at least one nutation deceleration device coupled to the corresponding operating table to drive the operating table to rotate about a second axis, wherein the first axis is different from the second axis.

The invention further provides an indexing rotary table for a CNC machine tool, comprising: a rotary table body provided with a plurality of chucks, a plurality of operating arms disposed along an outer periphery of the rotary table body; and a first nutation deceleration device with an input mechanism coupled to a first motor, and an output mechanism coupled to the rotary table body to drive the rotary table body to rotate about a first axis; wherein each of the plurality of operating arms comprises: a support column, an operating head and a cross arm connecting the support column and the operating head, wherein a top of the support column is coupled to one end of the cross arm through a second nutation deceleration device, the operating head is coupled to the other end of the cross arm through a third nutation deceleration device, input mechanisms of the second and third nutation deceleration devices are coupled to a motor, respectively, and output mechanisms of the second and third nutation deceleration devices are coupled to the cross arm and the operating table to drive the cross arm and the operating table to rotate about a second axis and a third axis, respectively; wherein the first, second and third axes are parallel to each other, and the first, second and third nutation deceleration devices are the nutation deceleration device disclosed in embodiments herein.

The invention further provides a CNC machine tool, comprising: a base; a translation device disposed on the base, and configured to move in a plane surface; an operating table disposed on the translation device, wherein the operating table is the double swing angle operating table disclosed above; a lifting device disposed on the base, and configured to move in a direction perpendicular to the plane surface; and a milling head disposed on the lifting device, wherein the milling head is the double swing angle milling head disclosed above.

The invention further provides a traction machine, comprising: a rack; a nutation deceleration device supported by the rack, wherein the nutation deceleration device is the nutation deceleration device disclosed in embodiments herein; a motor supported by the rack, and coupled to an input mechanism of the nutation deceleration device; a traction wheel supported by the rack, and adjacent to an output mechanism of the nutation deceleration device to drive the traction wheel to rotate; and a traction rope winded onto the traction wheel.

According to the traction machine in one or more embodiments of the invention, the rack has a segmented shell, and the motor, the nutation deceleration device and the traction wheel are accommodated within a corresponding section of the segmented shell, wherein the motor, the nutation deceleration device and the traction wheel are fixed to the segmented shell via a bearing, respectively.

The invention further provides an anchor machine for ships, comprising: a base; a nutation deceleration device supported by the base, wherein the nutation deceleration device is the nutation deceleration device disclosed in embodiments herein; a motor supported by the base, and coupled to an input mechanism of the nutation deceleration device; and an output disk supported by the base, and adjacent to an output mechanism of the nutation deceleration device to drive the output disk to rotate.

The invention further provides a revolving door for public places, comprising: a rotating door comprising a stand column and a plurality of door bodies radially extending from the stand column outwardly; and a rotating mechanism disposed on a top of the rotating door, and comprising: a shell; a nutation deceleration device disposed in the shell, wherein the nutation deceleration device is the nutation deceleration device disclosed in embodiments herein; and a motor disposed in the shell, and coupled to an input mechanism of the nutation deceleration device; wherein an output mechanism of the nutation deceleration device is coupled to a top of the stand column to drive the rotating door to rotate about the stand column.

The invention further provides a solar power conversion device, comprising: a base; a supporting pole disposed on the base; a nutation deceleration device between the base and the supporting pole, wherein the nutation deceleration device is the nutation deceleration device disclosed in embodiments herein, an input mechanism of the nutation deceleration device is coupled to a motor, and an output mechanism of the nutation deceleration device is coupled to a bottom of the supporting pole to drive the supporting pole to rotate; and a collection device swinging on a top of the supporting pole.

According to the solar power conversion device in one or more embodiments of the invention, it further comprises a second nutation deceleration device between the supporting pole and the collection device, the second nutation deceleration device being the nutation deceleration device disclosed in embodiments herein, wherein an input mechanism of the second nutation deceleration device is coupled to a second motor, and an output mechanism of the nutation deceleration device is coupled to the collection device to drive the collection device to swing.

The invention further provides a material transport device, comprising: a bracket; a plurality of rollers disposed on the bracket; a conveyor belt disposed on the plurality of rollers; and at least one nutation deceleration device being the nutation deceleration device disclosed in embodiments herein, wherein an input mechanism of the at least one nutation deceleration device is coupled to a motor, and an output mechanism of each of the at least one nutation deceleration device is coupled to the corresponding one of the plurality of rollers.

In view of above, advantageous effects of the invention lie in:

By using a cycloidal gear with a cycloidal tooth profile, issues of various inferences (including involute interference, node opposite addendum interference, profile overlap interference, radial interference, etc.) easily generated during the common involute tooth profile transmission are overcome.

By configuring the angles between the reference surfaces of the cycloidal gear/pin gear and the axis of the corresponding gears to be between 88° and 91°, and the sum of the two angles to be less than 180°, such characteristics of reference surfaces allow the reference surfaces of the cycloidal gear and the pin gear to be substantial flat surfaces to replace an internal bevel gear where the reference surfaces are often internal conical surfaces, such that the transverse cycloidal-pin gear pair provided by the invention is simple in mechanical machining, and has a low manufacturing cost.

By setting the reference surfaces of the cycloidal gear and the pin gear compulsively to be substantial flat, surfaces the number of teeth meshing with each other in the transverse cycloidal-pin gear pair at any moment during nutation transmission is four to five times, even eight to ten times of that in the case using traditional gear pair, which remarkably improves a carrying capacity and transmission stability;

By configuring the angles between the working flanks of the cycloidal gear/pin gear meshing with each other to satisfy the above relationship, the nutation transmission of the transverse cycloidal-pin gear pair has higher transmission efficiency.

DETAILED DESCRIPTION

Figure 1:
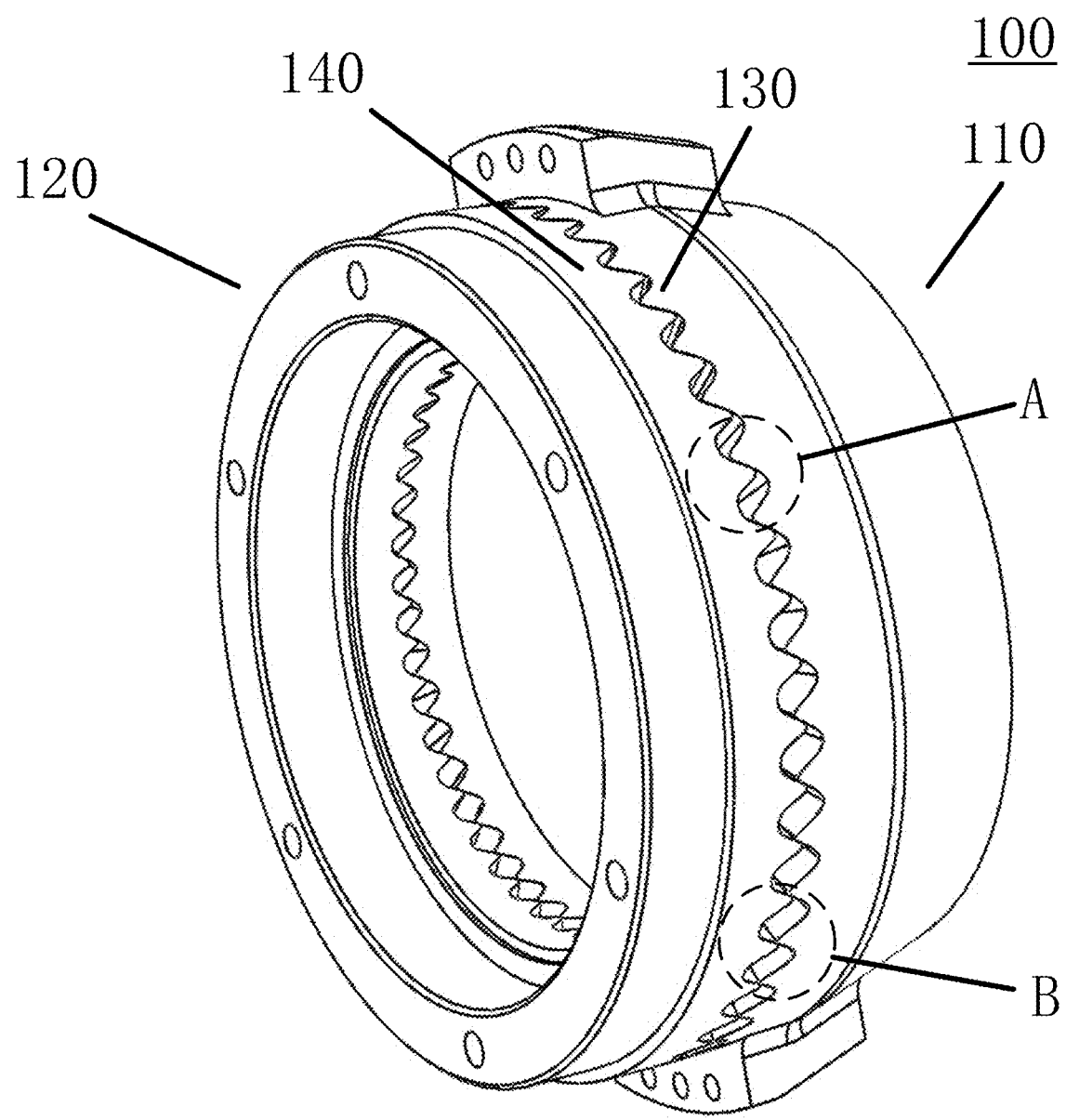
FIG. 1 is a schematic perspective diagram of a cycloidal-pin gear pair according to one embodiment of the invention.

To make features and advantages of the invention clearer, hereinafter the invention is further explained with reference to the accompanying drawings. It shall be noticed that embodiments illustrated in the drawings are provided to interpret the invention, instead of limiting the invention.

Please refer to FIG. 1, which illustrates a schematic perspective diagram of a cycloidal-pin gear pair 100 according to one embodiment of the invention.

The cycloidal-pin gear pair 100 comprises two gears 110 and 120 facing each other, one of the two gears is called as a cycloidal gear, and the other is called as a pin gear. Hereinafter the cycloidal-pin gear pair 100 is described in a manner considering the gear 110 as the cycloidal gear and considering the gear 120 as the pin gear. It shall be noticed that the cycloidal gear and the pin gear are exchangeable. For example, in other embodiments, it is also possible that the gear 110 is the pin gear, and the gear 120 is the cycloidal gear.

In this embodiment, the cycloidal-pin gear pair 100 is a transverse cycloidal-pin gear pair. In other words, the cycloidal gear 110 of the cycloidal-pin gear pair 100 is a transverse gear, i.e., a cycloidal tooth flank 130 of the cycloidal gear 110 is formed on a lateral surface substantially perpendicular to an axis OO' of the cycloidal gear 110, not a surface on an outer circumference or an inner circumference of the cycloidal gear 110. As compared to forming the tooth flank on the outer circumference or the inner circumference of the gear, the force applied on the gear formed with the tooth flank on one side during operation is spread across the entire thickness of the gear, and since the gear has a better rigidity in the direction of thickness, the gear formed with the tooth flank on one side can effectively prevent deformation during operation. Similarly, the pin gear 120 has a pin tooth flank 140 on one lateral surface. The pin tooth flank 140 and the cycloidal tooth flank 130 face each other, and are meshing with each other in a nutation transmission manner during operation. Since the cycloidal-pin gear pair 100 is usually used in a nutation deceleration device, the number of teeth formed on the cycloidal tooth flank 130 differs from the number of teeth formed on the pin tooth flank 140 by one tooth. For example, the cycloidal tooth flank 130 may be one tooth less than the pin tooth flank 140, or the cycloidal tooth flank 130 may be one tooth more than the pin tooth flank 140.

In this embodiment, the teeth formed on the cycloidal tooth flank 130 have a cycloidal tooth profile, and since the invention replace the involute tooth profile used in the traditional nutation deceleration device with the cycloidal tooth profile, issues of various inferences (including involute interference, node opposite addendum interference, profile overlap interference, radial interference, etc.) easily generated in the case using the involute tooth profile transmission are avoided.

Figure 2:
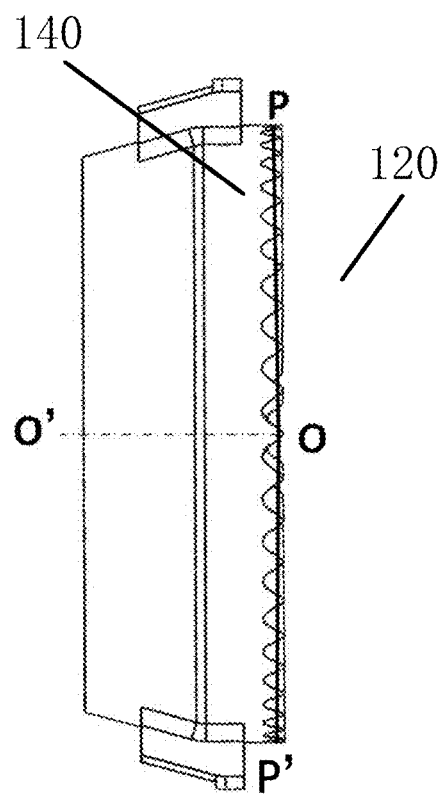
FIG. 2 is a side view of a pin gear of the cycloidal-pin gear pair shown in FIG. 1.
Figure 3A:
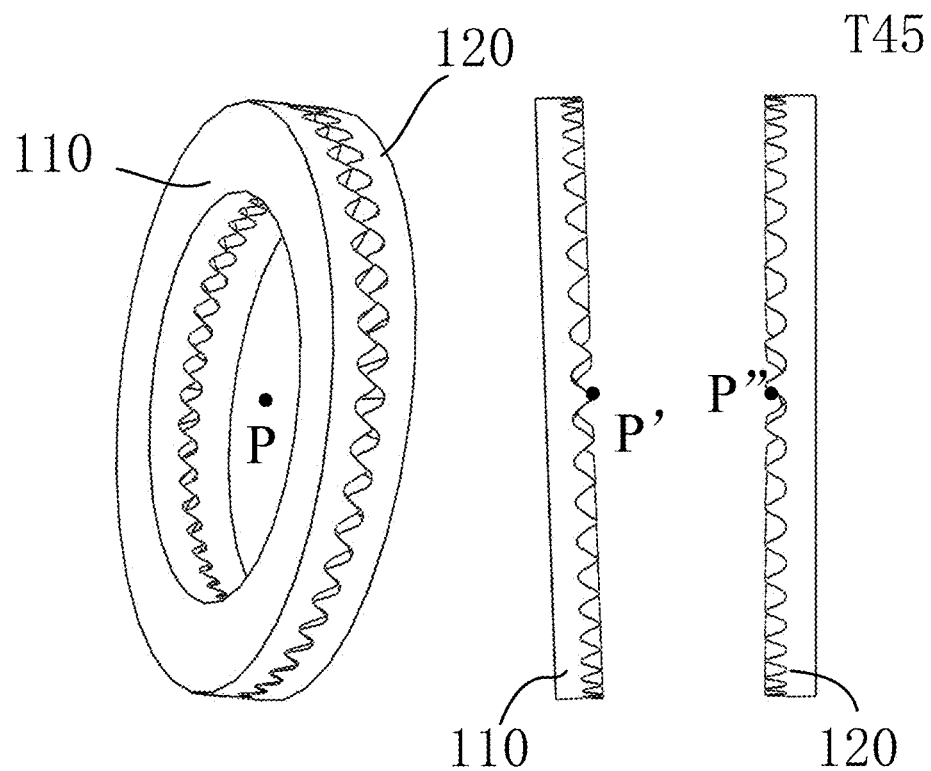
FIGS. 3A-3E illustrate schematic diagrams of a cycloidal-pin gear pair according to one preferable embodiment of the invention.
Figure 3B:
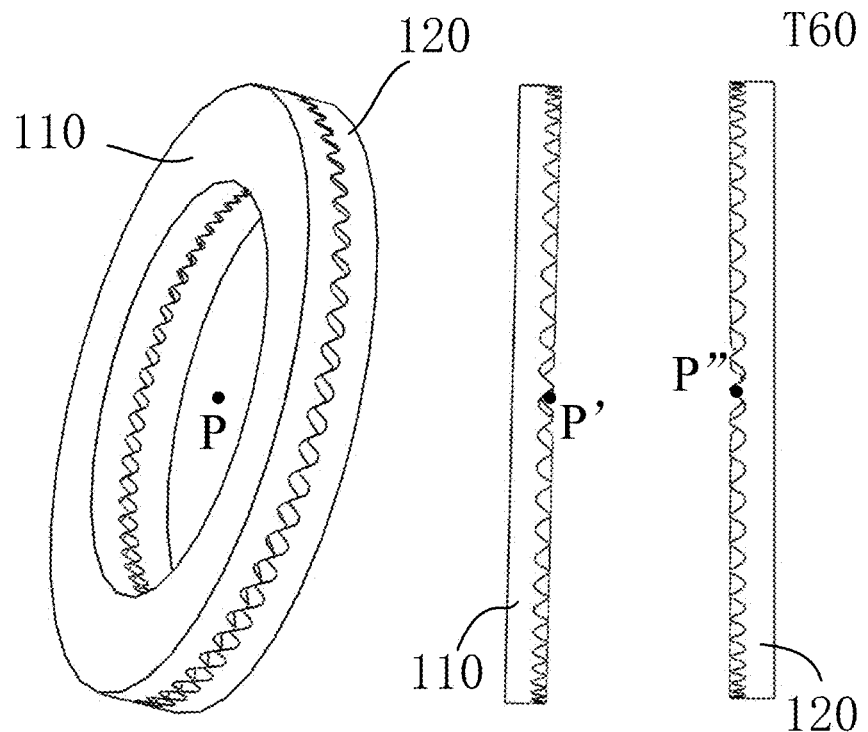
Figure 3C:
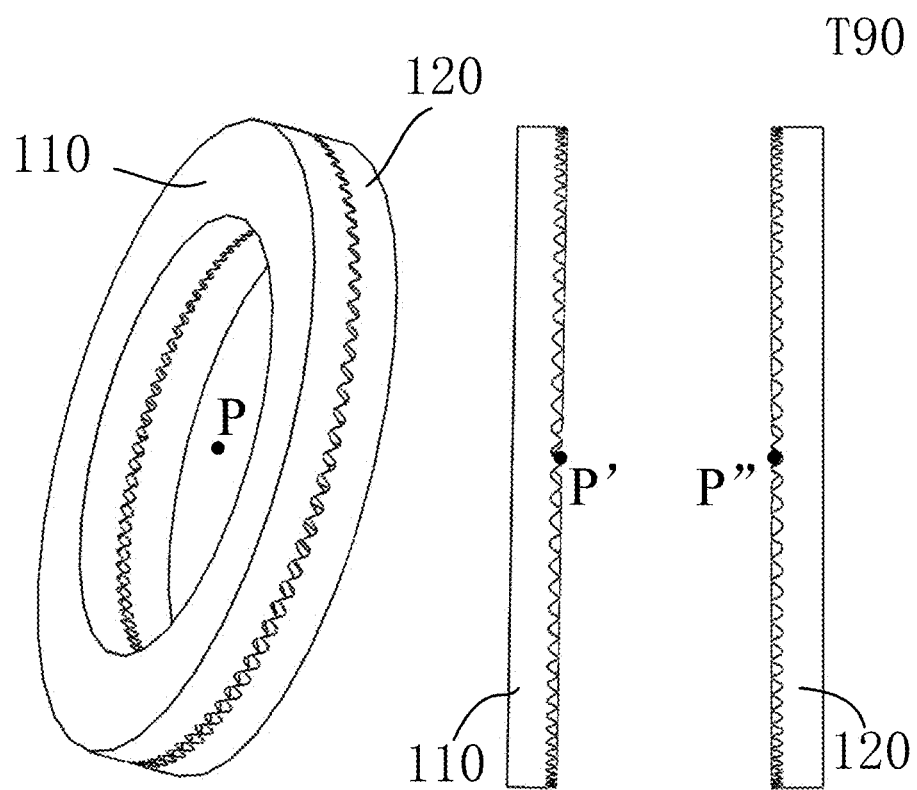
Figure 3D:
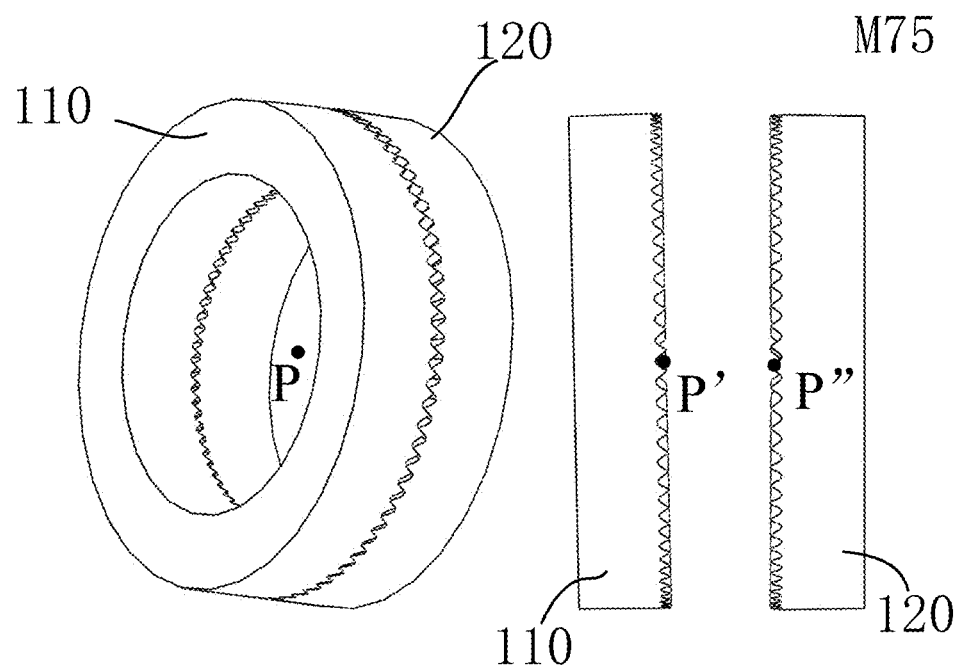
Figure 3E:
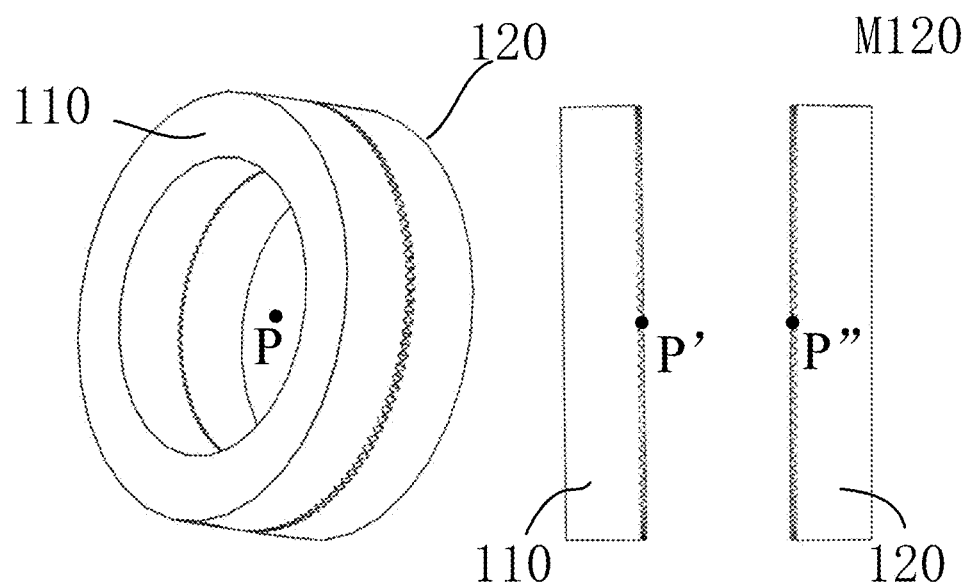

Please refer to FIG. 2, which illustrates a side view of a pin gear 120 of the cycloidal-pin gear pair 100 shown in FIG. 1. As shown in FIG. 2, assuming that each tooth of the pin tooth flank 140 has a straight line OP extending from a position between tooth root and tooth tip towards a center O of the pin gear 120, a surface formed by rotating the straight line OP one circle about the center O in a circumferential direction of the pin tooth flank 140 is called as an reference surface of the pin gear 120, and the center O is a center point of the reference surface. There is an angle ∠POO' between any generatrix (e.g., a straight line PO in FIG. 3) on the reference surface of the pin gear 120 and a center axis OO' of the pin gear 120. Although not illustrated, similarly with the pin gear 120, there is also an angle between any generatrix on the reference surface of the cycloidal gear 110 and its axis.

In design of the traditional gear, the angles between the reference surfaces of the gears and the its axis depend on the number of teeth formed on the tooth flanks. For example, as for the gear having 45 teeth, the angle between the reference surface and the axis is either greater than 90°, or less than 90°. In other words, the reference surface forms an internal conical surface in which the center of the reference surface is recessed towards the gear, or a protruded conical surface in which the center of the reference surface is protruded outwardly. As the number of teeth of the gear increasing, the angle between the reference surface and the axis becomes closer to 90°. In other words, As the number of teeth of the gear increasing, the reference surface becomes closer to a flat surface.

In the traditional gear pair, generally, one gear is formed as an internal bevel gear, and the other gear is formed as an external bevel gear. However, in the manufacturing industry of the gear, precise mechanical machining of the internal bevel gear is challenging, and in order to manufacture the precise internal bevel gear, it is often mainly machined using a CNC machine tool, which increases cost. Meanwhile, as for the traditional gear pair, during one cycle of nutation motion of a nutation gear, only a small portion of teeth between the two gears perform meshing transmission at each moment, and most of teeth do not contact with each other (e.g., similarly with a part surrounded by a dotted line B in FIG. 1). For example, as for the nutation gear having forty-five teeth, during one cycle of nutation motion, only two to three teeth perform meshing transmission, and the remaining teeth are always separated from each other, such that the transmitted gear pair has issues of a small carrying capacity and poor transmission stability.

The inventors find that the reference surfaces of the two gears in the gear pair are set compulsively to be substantial flat surfaces, instead of a surface depending on the number of teeth of the gears, which can remarkably increase the number of teeth for meshing transmission during nutation.

Specifically, in one embodiment, angle between the reference surfaces of the cycloidal gear 110/pin gear 120 and the corresponding axis is between 88° and 91°, and particularly between 88° and 90°. Moreover, a sum of the two angles between the reference surfaces of the cycloidal gear 110/pin gear 120 and the corresponding axis is less than 180°. For example, the reference surface of one of the cycloidal gear 110 and the pin gear 120 is a flat surface (i.e., the angle is 90°), and the reference surface of another gear is a slightly protruded conical surface protruded outwardly (i.e., the angle is greater than 88° and less than 90°), or the reference surfaces of the cycloidal gear 110 and the pin gear 120 are both protruded conical surfaces slightly protruded outwardly. The inventors find that, as for the cycloidal-pin gear pair 100 formed by the cycloidal gear 110 and the pin gear 120 with the reference surfaces having the above characteristics, during one cycle of nutation motion of the cycloidal gear 110, more teeth between the cycloidal gear 110 and the pin gear 120 will perform meshing transmission. For example, as for the cycloidal gear 110 having forty-five teeth, during one cycle of nutation motion, twelve to thirteen teeth perform meshing transmission between the cycloidal gear 110 and the pin gear 120, which largely increases a carrying capacity and transmission stability of the cycloidal-pin gear pair.

Moreover, since the cycloidal gear 110 and the pin gear 120 have reference surfaces are formed as substantial flat surfaces, or conical surfaces slightly protruded upwardly or recessed downwardly to replace the internal bevel gears used in the traditional nutation deceleration device, as compared to the traditional nutation gear for the nutation deceleration device, the cycloidal-pin gear pair provided in the invention is simple in mechanical machining, and has a low manufacturing cost.

TABLE 1

| Cycloidal-pin gear pair | Number of teeth of the pin gear | Number of teeth of the cycloidal gear | Reference angle of the cycloidal gear/° | Reference angle of the pin gear/° | Interaxial angle/° |
|---|---|---|---|---|---|
| T45 | 45 | 44 | 88.032 | 90 | 178.032 |
| T60 | 60 | 59 | 88.61812 | 90 | 178.61812 |
| T90 | 90 | 89 | 89.06873 | 90 | 179.06873 |
| M75 | 75 | 74 | 88.79935 | 90 | 178.79935 |
| M120 | 120 | 119 | 89.2431 | 90 | 179.2431 |

Table 1 illustrates a preferable embodiment of the cycloidal-pin gear pair having different numbers of teeth. In the embodiment illustrated in Table 1, the numbers of teeth of the pin gear in the cycloidal-pin gear pair are 45, 60, 90, 75 and 120, respectively, and the numbers of teeth of the cycloidal gear are one tooth less than the corresponding numbers of teeth of the pin gear, which are 44, 59, 89, 74 and 119, respectively. As can be seen from Table 1, the reference angles (i.e., the angles between the reference surfaces of the pin gear and axis) of the pin gear illustrated are 90°. In other words, the reference surfaces of the pin gear are all flat surfaces. Meanwhile, the reference angles (i.e., the angles between the reference surfaces of the cycloidal gear and axis) of the cycloidal gear are substantially between 88° and 90°, and particularly between 88° and 89.5°. In other words, the reference surfaces of the cycloidal gear are preferably formed as protruded conical surfaces slightly protruded upwardly. The interaxial angles in Table 1 are angles between the axis of each the cycloidal gear and the axis of the corresponding pin gear (i.e., a sum of the reference angle of the pin gear and the reference angle of the cycloidal gear).

Meanwhile, referring to FIGS. 3A-3E, which illustrate schematic diagrams of cycloidal-pin gear pairs T45, T60, T90, M75 and M120 in Table 1, respectively. In FIGS. 3A-3E, a point P' is a center of the reference surfaces of the cycloidal gears in the respective cycloidal-pin gear pairs, a point P''' is a center of the reference surfaces of the pin gears in the respective cycloidal-pin gear pairs, and when the cycloidal gears and the pin gears in the respective cycloidal-pin gear pairs mesh with each other during nutation motion, the point P' of the reference surfaces of the cycloidal gears and the point P''' of the reference surfaces of the pin gears are overlapped to a point P.

As is stated previously, since the number of teeth of the cycloidal tooth flank 130 is different from the number of teeth of the pin tooth flank 140, when the cycloidal gear 110 and the pin gear 130 mesh with each other, the cycloidal tooth flank 130 and the pin tooth flank 140 are not completely meshed, but partially meshed together. As shown in FIG. 1, in a part surrounded by a dotted line A, only a portion of sidewalls of the teeth of the cycloidal gear 110 and the pin gear 130 contact with each other, and in a part surrounded by the dotted line B, the teeth of the cycloidal gear 110 and the pin gear 130 are separated from each other without contacting.

Figure 4:
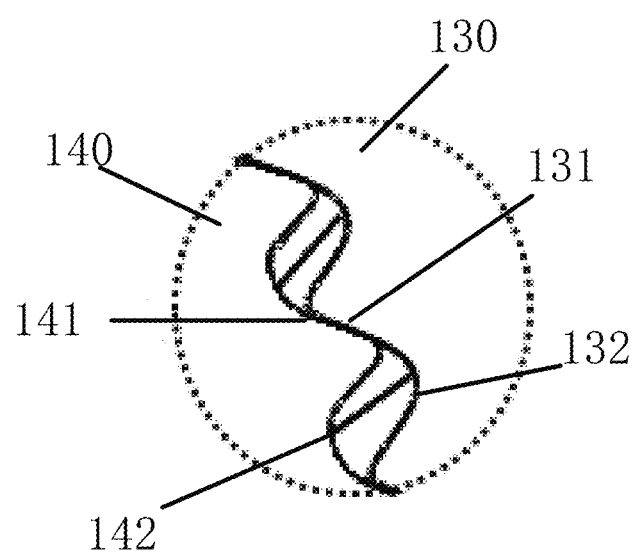
FIG. 4 is a practical enlarged view of the cycloidal-pin gear pair shown in FIG. 1.

Please refer to FIG. 4, which illustrates a practical enlarged view of a portion of the cycloidal-pin gear pair 100 surrounded by the dotted line A in FIG. 1. As shown in FIG. 4, when the cycloidal tooth flank 130 and the pin tooth flank 140 are partially meshed with each other, a portion 131 of teeth of the cycloidal tooth flank 130 and a portion 141 of teeth of the pin tooth flank 140 contact each other, while another portion 132 of teeth of the cycloidal tooth flank 130 and another portion 142 of teeth of the pin tooth flank 140 are separated from each other. In this embodiment, the portions 131 and 141 are called as cycloidal gear working flank 121 and pin gear working flank 141, respectively, and the portions 132 and 142 are called as cycloidal gear non-working flank 132 and pin gear non-working flank 142, respectively. In this embodiment, during the operation of the cycloidal-pin gear pair 100 for the nutation deceleration device, the cycloidal gear 110 may perform nutation motion, and under action of nutation motion of the cycloidal gear 110 and partial meshing of the cycloidal tooth flank 130 and the pin tooth flank 140, the cycloidal gear 110 and the pin gear 120 may rotate relative to each other.

It shall be noticed that although FIG. 4 illustrates a partial meshing state of the cycloidal tooth flank 130 and the pin tooth flank 140 at one certain moment, during the nutation motion of the cycloidal gear 110, a portion of each tooth of the cycloidal tooth flank 130 contacts a portion of the corresponding tooth of the pin tooth flank 140 in a sliding manner. Therefore, as along as a portion of the cycloidal tooth flank 130 and a portion of the pin tooth flank 140 contact with each other at any moment during nutation motion of the cycloidal gear 110, the contact portions of the cycloidal tooth flank 130 and the pin tooth flank 140 contacting are called as working flanks. In contrast, at any moment of nutation motion of the cycloidal gear 110, portions of cycloidal tooth flank 130 and the pin tooth flank 140 not contacting with each other are called as non-working flanks.

Figure 5A:
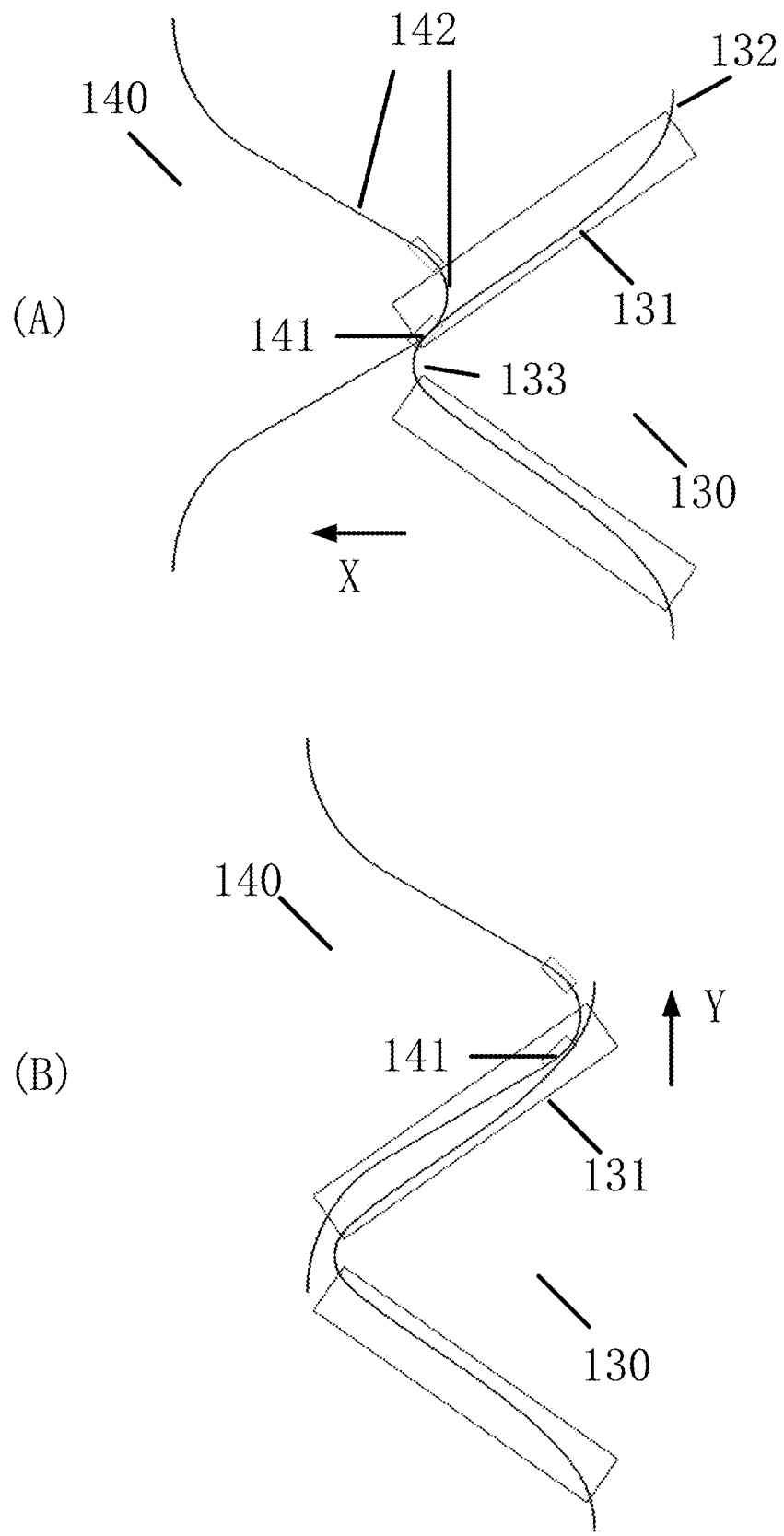
FIGS. 5A and 5B illustrate schematic diagrams of a meshing relationship of gears in the cycloidal-pin gear pair according to one embodiment of the invention.

Hereinafter a contact state of the cycloidal tooth flank 130 and the pin tooth flank 140 during one nutation motion of the cycloidal gear 110 is described with reference to FIG. 5A. At phase (A) in FIG. 5A, a leftmost end of a section 131 of the cycloidal tooth flank 130 contacts a section 141 of the pin tooth flank 140. Subsequently, with nutation motion of the cycloidal gear 110, the cycloidal gear 110 interacts with the pin gear 120 along a direction X, such that the section 141 of the pin tooth flank 140 slides from the leftmost end to a rightmost end along the section 131 of the cycloidal tooth flank 130 (i.e., phase (B) in FIG. 5A). When the section 141 slides from the leftmost end of the section 131 to the rightmost end, since the pin gear 120 is pushed by the cycloidal gear 110 due to the nutation motion along the direction X, the pin gear 120 runs along a direction Y relative to the cycloidal gear 110, thereby rotating about its axis.

Here, since the section 141 slides from the leftmost end of the section 131 to the rightmost end during one nutation motion of the cycloidal gear 110, the section 131 surrounded by a large rectangular frame in the cycloidal tooth flank 130 is called as the cycloidal gear working flank 131, and the section 141 surrounded by a small rectangular frame in the pin tooth flank 140 is called as the pin gear working flank 141. Meanwhile, the section 132 outside the large rectangular frame (e.g., tooth root and tooth tip of each tooth of the cycloidal tooth flank 130 in FIG. 5A) in the cycloidal tooth flank 130 is called as the cycloidal gear non-working flank 132, and the section 142 outside the small rectangular frame (e.g., tooth tip and most tooth sidewall of each tooth of the pin tooth flank 140 in FIG. 5A) in the pin tooth flank 140 is called as the pin gear non-working flank 142.

Accordingly, in each cycle of nutation motion of the cycloidal gear 110, the cycloidal gear working flank 131 and the pin gear working flank 141 contact with each other once in a sliding manner, so the cycloidal gear 110 only pushes the pin gear 120 to rotate a small angle every one cycle of nutation motion, thereby realizing a large transmission ratio between the cycloidal gear 110 and the pin gear 120. In the case that the cycloidal gear 110 and the pin gear 120 have a difference of one tooth, the pin gear rotates one tooth in each cycle of nutation motion of the cycloidal gear 110.

Figure 5B:
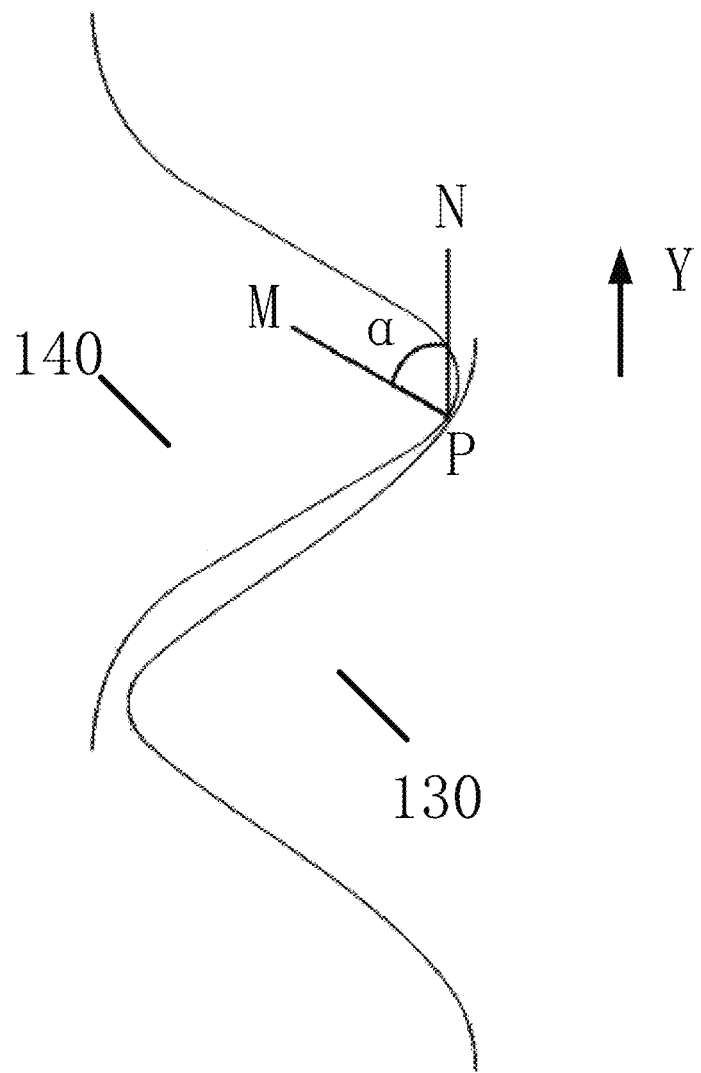

Please refer to FIG. 5B, which illustrates that the cycloidal tooth flank 130 and the pin tooth flank 140 contact each other at the point P, and perform meshing transmission. As is stated in FIG. 5B, a line PM illustrates a normal direction of the pin tooth flank 140 at the point P, and a line PN illustrates a motion direction of the pin gear 120 at the point P when the cycloidal tooth flank 130 and the pin tooth flank 140 contact at the point P. Due to the nutation motion of the cycloidal gear 110, the cycloidal tooth flank 130 pushes the pin tooth flank 140 at the point P such that the pin gear 120 rotates along the direction Y, so the line PN is parallel to the direction Y. Angle α between the lines PM and PN is a pressure angle when the cycloidal tooth flank 130 and the pin tooth flank 140 contact. This pressure angle indicates work efficiency (i.e., transmission efficiency) of the cycloidal tooth flank 130 to the pin tooth flank 140 when the cycloidal tooth flank 130 and the pin tooth flank 140 contact with each other. The inventors find that when tooth profiles of the cycloidal gear 110 and the pin gear 120 are configured to allow the pressure angle to be a suitable angle, the cycloidal-pin gear pair 100 formed by the cycloidal gear 110 and the pin gear 120 has optimum transmission efficiency.

Specifically, in one embodiment, if the pressure angle when the cycloidal tooth flank 130 and the pin tooth flank 140 contact satisfies the following relationship: $45°-\beta-5°\leq\alpha\leq45°-\beta+5°$, the cycloidal-pin gear pair 100 may have the optimum transmission efficiency. In the relationship, α indicates the pressure angle when the cycloidal tooth flank 130 and the pin tooth flank 140 contact with each other, and angle β indicates a friction angle between the cycloidal tooth flank 130 and the pin tooth flank 140. The friction angle is an inherent property of the cycloidal tooth flank 130 and the pin tooth flank 140, depends on a material for manufacturing the cycloidal gear 110 and the pin gear 120 and a lubricant used therefor, and is often between 3° and 5°. For example, if the friction angle between the cycloidal tooth flank 130 and the pin tooth flank 140 is 3°, the pressure angle when the cycloidal tooth flank 130 and the pin tooth flank 140 contact with each other is preferably between 37° and 47°, and if the friction angle between the cycloidal tooth flank 130 and the pin tooth flank 140 is 5°, the pressure angle when the cycloidal tooth flank 130 and the pin tooth flank 140 contact with each other is preferably between 35° and 45°.

To realize the pressure angle, in some embodiments, the pin gear working flank 141 may be formed as a conical surface tapered towards an reference conical point (such as, point O in FIG. 2) of the pin gear 110, such that a cone tip of the cone surface where the pin gear working flank 141 located is overlapped with the reference cone tip of the pin gear 110, and an axis of the cone where the pin gear working flank 141 located is on the reference surface of the pin gear 110, i.e., the axis of the cone of the pin gear working flank 141 is one generatrix of the reference surface of the pin gear 110. Shape of the cycloidal gear working flank 131 depends on shape of the pin gear working flank 141, and the cycloidal gear working flank 131 is an envelope of the pin gear working flank 141.

In some embodiments, the cycloidal gear non-working flank 132 consists of a flat surface and a conical surface, and the cycloidal gear working flank 131 may be tangent to the cycloidal gear non-working flank 132.

In some embodiments, the pin gear non-working flank 142 consists of a flat surface and a conical surface, and the pin gear working flank 141 may be tangent to the pin gear non-working flank 142.

Figure 6A:
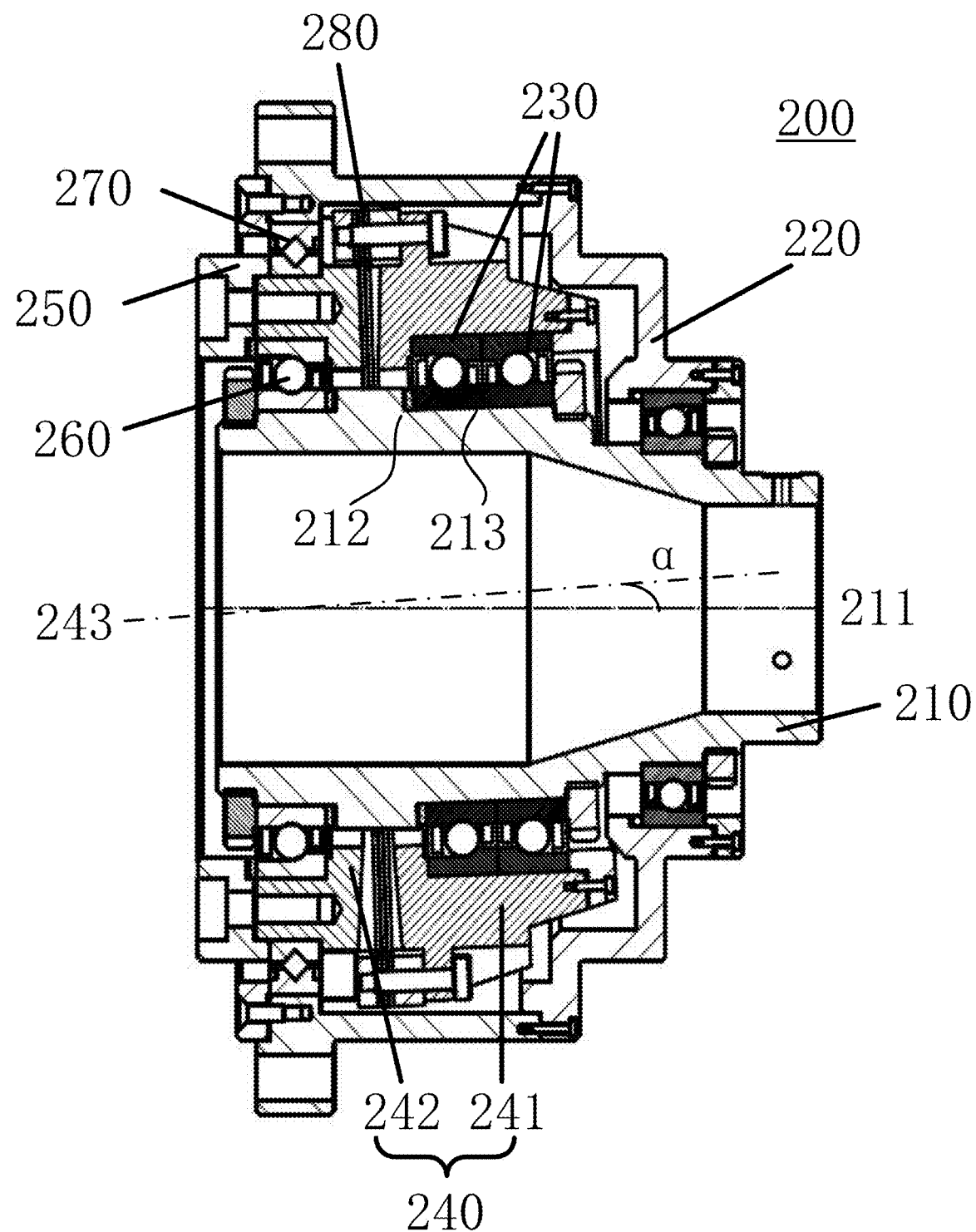
FIGS. 6A and 6B illustrate schematic diagrams of a nutation deceleration device according to one embodiment of the invention.
Figure 6B:
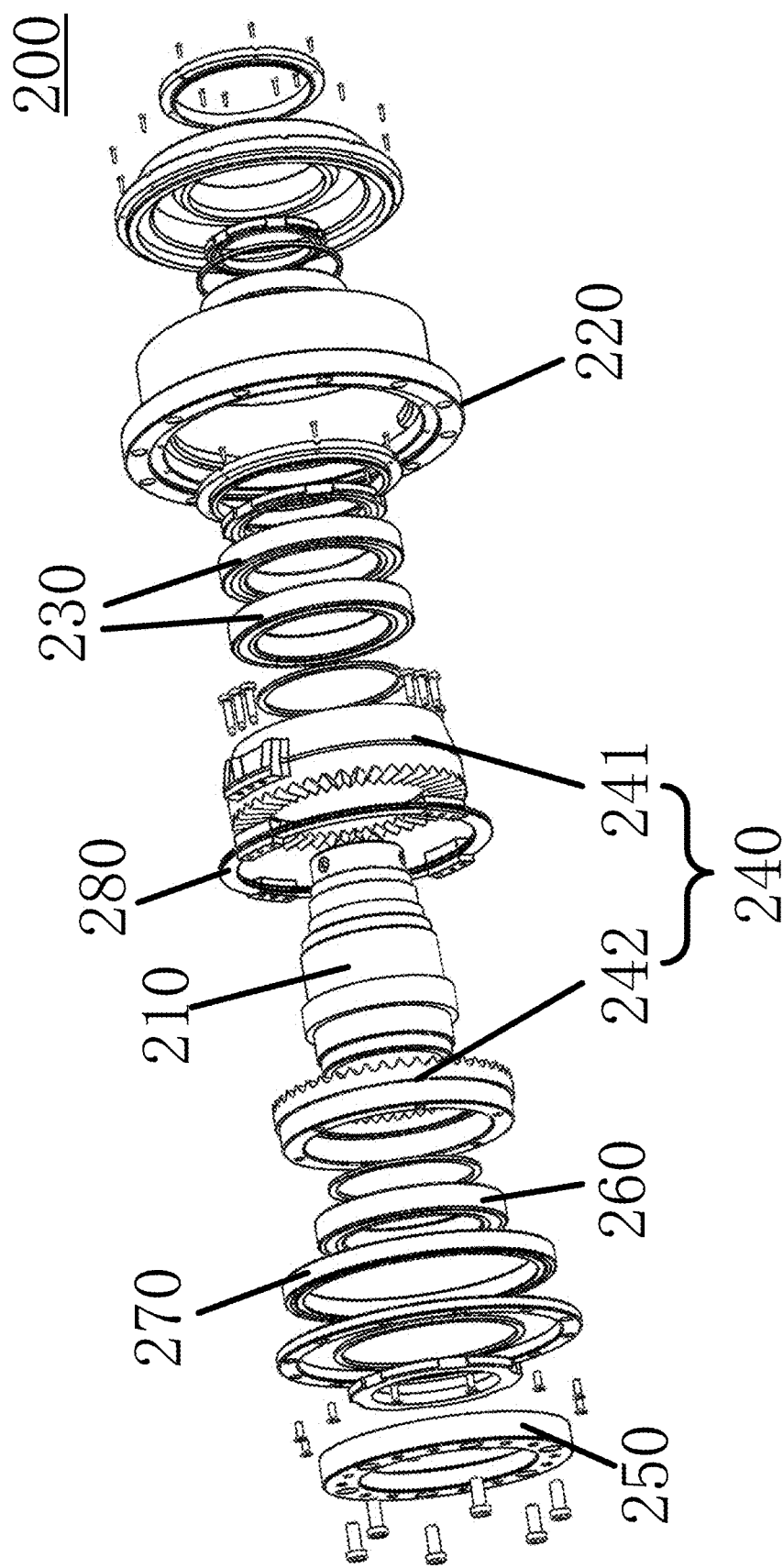

Please refer to FIGS. 6A and 6B, wherein FIG. 6A illustrates a sectional view of a nutation deceleration device 200 according to one embodiment of the invention, and FIG. 6B illustrates an exploded view of the nutation deceleration device 200.

The nutation deceleration device 200 comprises a shell 220, and an input mechanism 210 (such as, an input shaft) passing through the shell 220. Generally, the input shaft 210 is coupled to an output component of a motor to drive the input mechanism 210 to rotate about its axis through the motor.

A cycloidal-pin gear pair 240 as described above is disposed in the shell 220, and the cycloidal-pin gear pair 240 has a cycloidal gear and a pin gear. It shall be noticed that in some embodiments, the cycloidal gear may perform nutation motion, and the pin gear may rotate relative to the cycloidal gear under action of nutation motion. In some other embodiments, the pin gear may perform nutation motion, and the cycloidal gear may rotate relative to the pin gear under action of nutation motion. Therefore, in subsequent descriptions, the gear (one of the cycloidal gear and the pin gear) for nutation motion in the cycloidal-pin gear pair 240 is called as a nutation gear, and the gear (the other of the cycloidal gear and the pin gear) not for nutation motion is called as a non-nutation gear.

An input mechanism 210 is coupled to the cycloidal-pin gear pair 240 via a bearing assembly 230, and an output mechanism 250 (such as, an annular output member illustrated in FIGS. 6A and 6B) is also coupled to the cycloidal-pin gear pair 240. When the input mechanism 210 is applied with input rotation, the cycloidal-pin gear pair 240 is configured such that a cycloidal gear 241 may perform nutation motion under the driven by the input rotation. Due to the nutation motion of the cycloidal gear 241 and partial meshing of the nutation gear 241 and the non-nutation gear 242 in the cycloidal-pin gear pair 240, the cycloidal-pin gear pair 240 decelerate the input rotation to output rotation. Then an output component 250 coupled to the cycloidal-pin gear pair 240 outputs the output rotation.

In this embodiment, the input shaft 210 is fitted into a center opening of the nutation gear 241 via the bearing assembly 230. By using the bearing assembly 230, rotation of the input shaft 210 applied with the input rotation does not drive the nutation gear 241 to rotate about its axis. The nutation gear 241 inclines relative to the input shaft 210. For example, the input shaft 210 is provided with a nutation step 212 at a position of the input shaft 210 where the input shaft 210 is coupled to the nutation gear 241 via the bearing assembly 230, and the nutation step 212 is formed by being recessed into a sidewall of the input shaft 210. A step surface 213 of the nutation step 212 inclines (such as, at angle α) relative to a rotational axis 211 of the input shaft 210. As shown in FIG. 6A, the nutation gear 241 is coupled to the input shaft 210 via a bearing 230 at the nutation step 212, an internal circumference of the bearing 230 is tightly adjacent to the step surface 213, and an external circumference is tightly adjacent to the internal circumference of the nutation gear 241, so a center axis 243 of the nutation gear 241 and the rotational axis 211 of the input shaft 210 are also angled at angle α (i.e., the nutation angle). Therefore, when the input shaft 210 rotates, although the nutation gear 241 does not rotate together with the input shaft 210, the nutation gear 241 perform nutation motion in the shell 220 due to the angle α.

In this embodiment, the non-nutation gear 242 is coupled to the shell 220 via a bearing 270, and coupled to the input shaft 210 via a bearing 260. In this embodiment, the external circumference of the non-nutation gear 242 is fitted onto an internal circumference of the bearing 270, an external circumference of the bearing 270 is fixed with the shell 220, and the input shaft 210 is fitted into a center opening of the non-nutation gear 242 via the bearing 260. Accordingly, the non-nutation gear 242 can be rotatable located inside the shell 220 between the shell 220 and the input shaft 210. The non-nutation gear 242 is coupled to the output component 250. In this embodiment, the output component 250 may be a circular component, and has an inner diameter and an outer diameter that are substantially the same as that of the non-nutation gear 242, such that one side of the output component 250 is attachable to one side of the non-nutation gear 242 that is not provided with tooth flank. For example, a plurality of screw holes is formed on one side of the non-nutation gear 242 that is not provided with the tooth flank, so the output component 250 may be attached to the non-nutation gear 242 via a plurality of screws. Accordingly, the output component 250 and the non-nutation gear 242 may be formed as a combination for rotation together. Therefore, when the nutation gear 241 performs nutation motion, due to the relationship of meshing transmission between the nutation gear 241 and the non-nutation gear 242, the non-nutation gear 242 is driven to rotate about its axis with the decelerated output rotation, and the non-nutation gear 242 transfers the output rotation to the output component 250.

The nutation gear 241 and the non-nutation gear 242 may be configured that the output component 250 and the input shaft 210 rotate towards the same direction or opposite directions. For example, in the case that the nutation gear 241 is one tooth less than the non-nutation gear 242, the input shaft 210 and the output component 250 rotate in the same direction, and in the case that the nutation gear 241 is one tooth more than the non-nutation gear 242, the input shaft 210 and the output component 250 rotate in opposite directions.

As is stated previously, when the nutation gear 241 performs nutation motion, the non-nutation gear 242 rotates relative to the nutation gear 241 due to the nutation motion of the nutation gear 241. However, since rotation between the nutation gear 241 and the non-nutation gear 242 is relative, there is also a tendency that the nutation gear 241 rotates in a direction opposite to a rotational direction of the non-nutation gear 242 as the non-nutation gear 242 rotates. In this embodiment, the nutation deceleration device 200 also comprises a torque transfer component 280 with one end coupled to the nutation gear 241, and the other end coupled to the shell 220. The rotated torque of the nutation gear 241 is transferred to the shell 220 through the torque transfer component 280, such that the degree of freedom of that the nutation gear 241 rotates about its axis is constrained by the torque transfer component 280, and the nutation gear 241 is fixed to the shell 220, and only performs nutation motion when driven by the input shaft 210. In other words, in the nutation deceleration device 200, the nutation gear 241 only performs nutation motion, the non-nutation gear 242 rotates due to the nutation motion of the nutation gear 241, and the decelerated output rotation is transferred to the output component 250 attached thereto.

In some embodiments, the torque transfer component 280 can be ball basket or hooke hinge. In some other embodiments, the torque transfer component 280 is preferably a flexible component made of elastic elements such as, corrugated pipe, corrugated diaphragm, or spring diaphragm, and as compared to the torque transfer component such as, ball basket or hooke hinge, used in the traditional nutation deceleration device, the flexible component using elastic elements has a smaller volume. Moreover, due to nutation motion of the nutation gear 241, vibration between the nutation gear 241 and an additional component is absorbed by the flexible component 280, thereby increasing transmission stability.

Figure 7A:
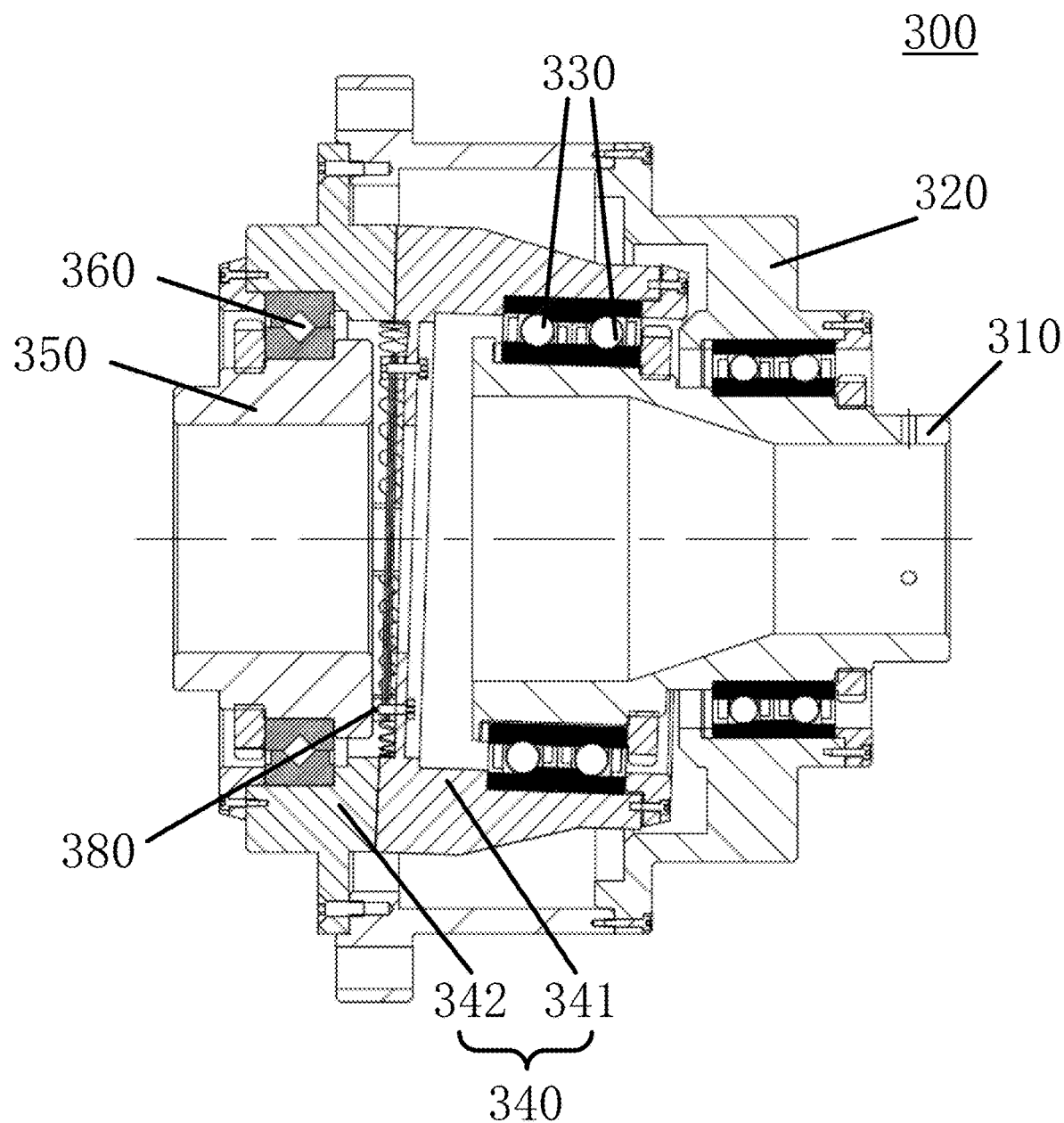
FIGS. 7A and 7B illustrate schematic diagrams of a nutation deceleration device according to another embodiment of the invention.
Figure 7B:
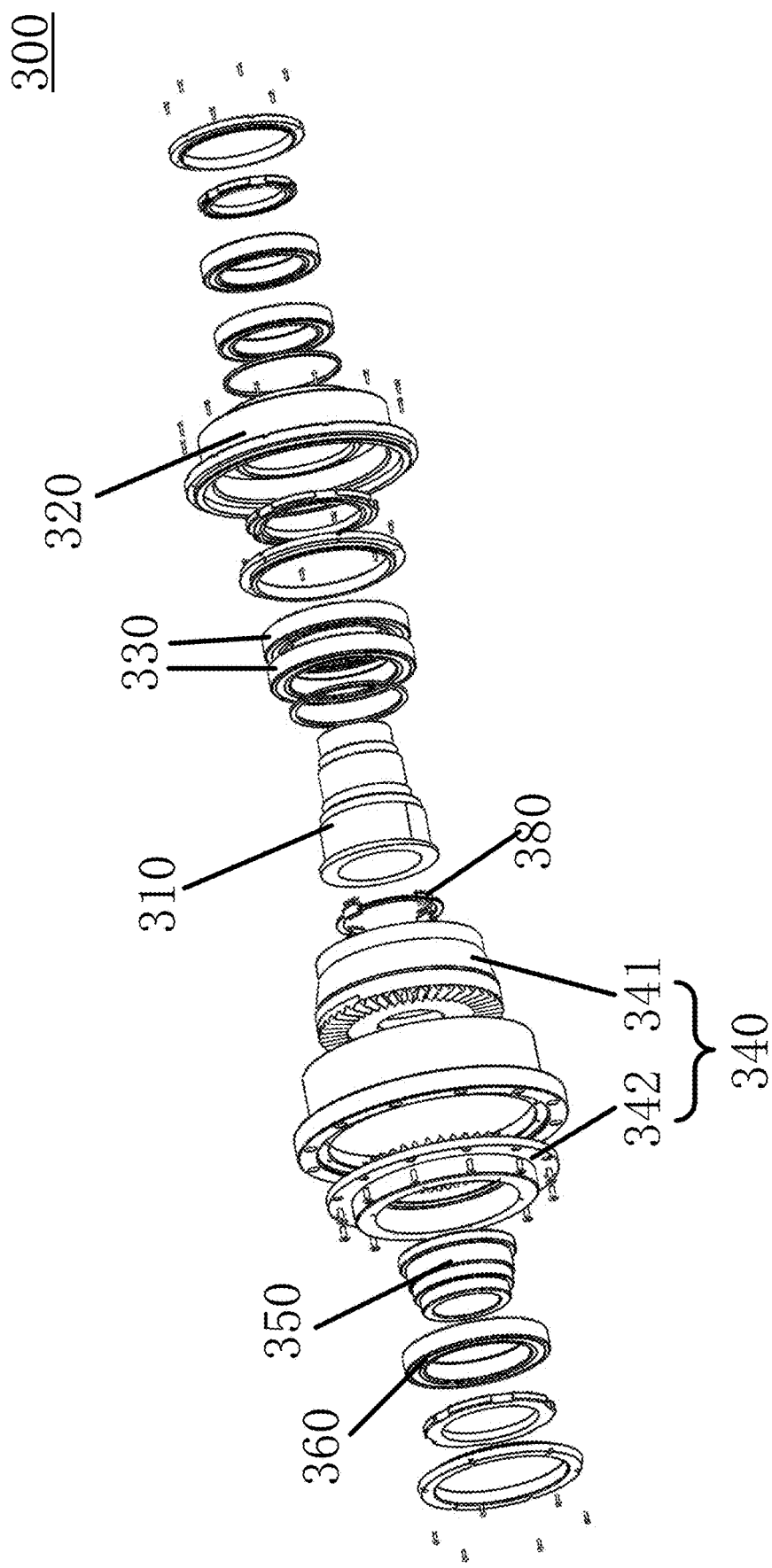

Please refer to FIGS. 7A and 7B, wherein FIG. 7A illustrates a sectional view of a nutation deceleration device 300 according to another embodiment of the invention, and FIG. 7B illustrates an exploded view of the nutation deceleration device 300.

Hereinafter differences between the nutation deceleration device 300 and the nutation deceleration device 200 are mainly described. In the nutation deceleration device 300, an input shaft 310 is coupled to a nutation gear 341 via a bearing assembly 330. Similarly with the nutation deceleration device 200 in FIGS. 6A and 6B, the nutation gear 341 has a nutation step at a position of the nutation gear 341 where is nutation gear 341 is coupled to the nutation gear 341 via the bearing assembly 330, such that a center axis of the nutation gear 341 is arranged obliquely relative to an axis of the input shaft 310, and the nutation gear 341 performs nutation motion when driven by the input shaft 310. A non-nutation gear 342 and the nutation gear 341 contact and mesh with each other, and coupled to an output shaft 350 via a bearing 360, and the non-nutation gear 342 and the shell 320 are coupled rigidly. Since the bearing 360 is between the non-nutation gear 342 and the output shaft 350 in the nutation deceleration device 300, the output shaft 350 may rotate separately independent from the non-nutation gear 342. A torque transfer component 380 has one end coupled to the nutation gear 341, and the other end coupled to the output shaft 350. Therefore, a torque of the nutation gear 341 may be transferred to the output shaft 350 through the torque transfer component 380.

As is illustrated in FIGS. 7A and 7B, due to meshing transmission between the nutation gear 341 and the non-nutation gear 342, when the nutation gear 341 performs nutation motion, the non-nutation gear 342 rotates relative to the nutation gear 341 due to the nutation motion of the nutation gear 341. However, in the nutation deceleration device 300, the non-nutation gear 342 cannot rotate due to rigid connection to the shell 320, so the nutation gear 341 further rotates about its axis at the output rotation speed lower than a rotational speed of the input shaft 310 while the nutation gear 341 performs nutation motion. Since the nutation gear 341 transfers a torque itself to the output shaft 350 through the torque transfer component 380, the output shaft 350 also rotates along with the nutation gear 341, thereby transferring the decelerated output rotation to an output shaft 355.

In this embodiment, the torque transfer component 380 can be an elastic element made of corrugated pipe, corrugated diaphragm, spring diaphragm, and the like, and as compared to the torque transfer component such as, ball basket or hooke hinge, used in the traditional nutation deceleration device, the flexible component using the elastic element has a smaller volume. Moreover, due to nutation motion of the nutation gear 341 and rotation itself, vibration between the nutation gear 341 and an additional component may be absorbed by the flexible component, thereby increasing transmission stability.

Figure 8A:
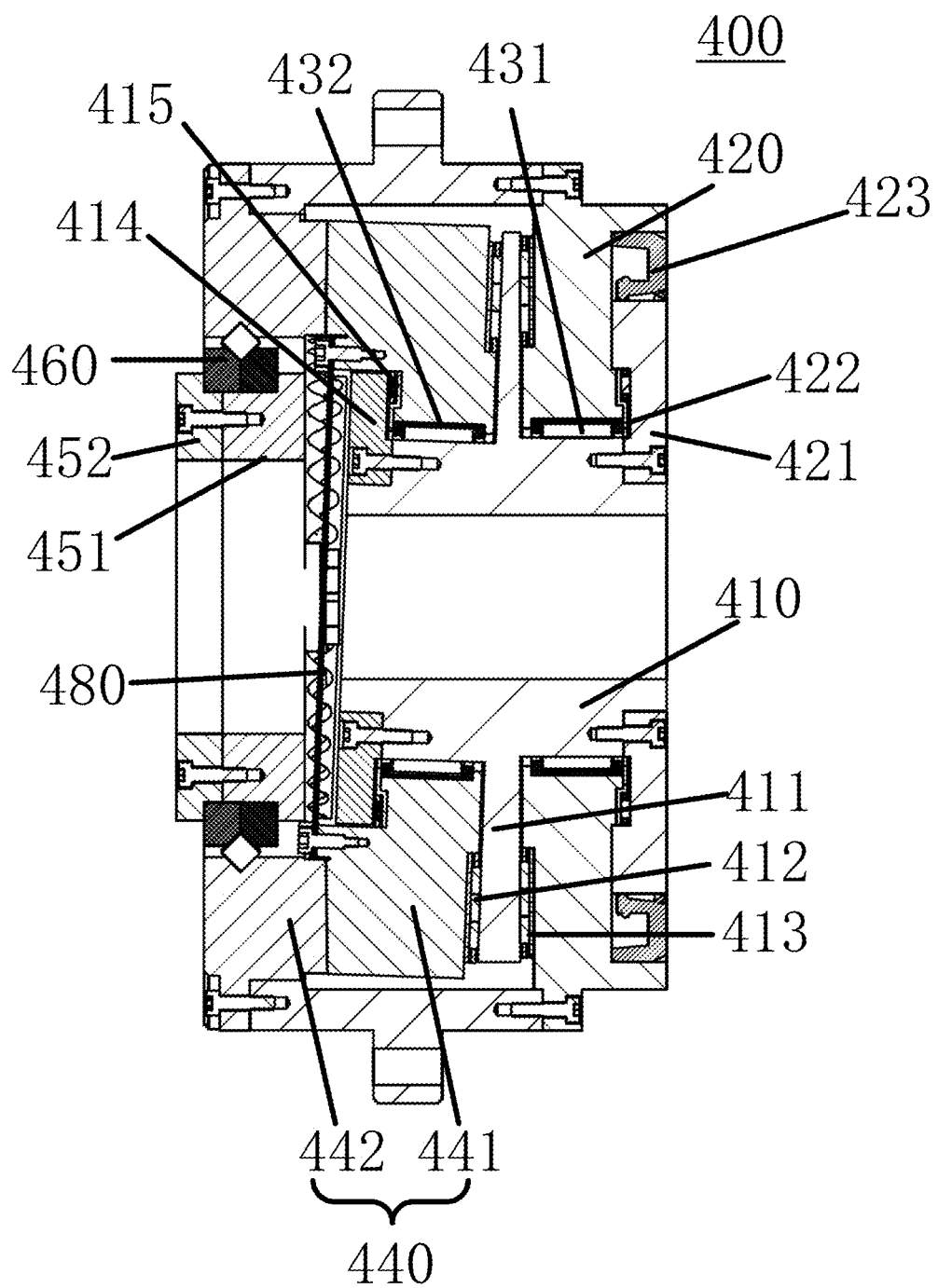
FIGS. 8A and 8B illustrate schematic diagrams of a nutation deceleration device according to another embodiment of the invention.
Figure 8B:
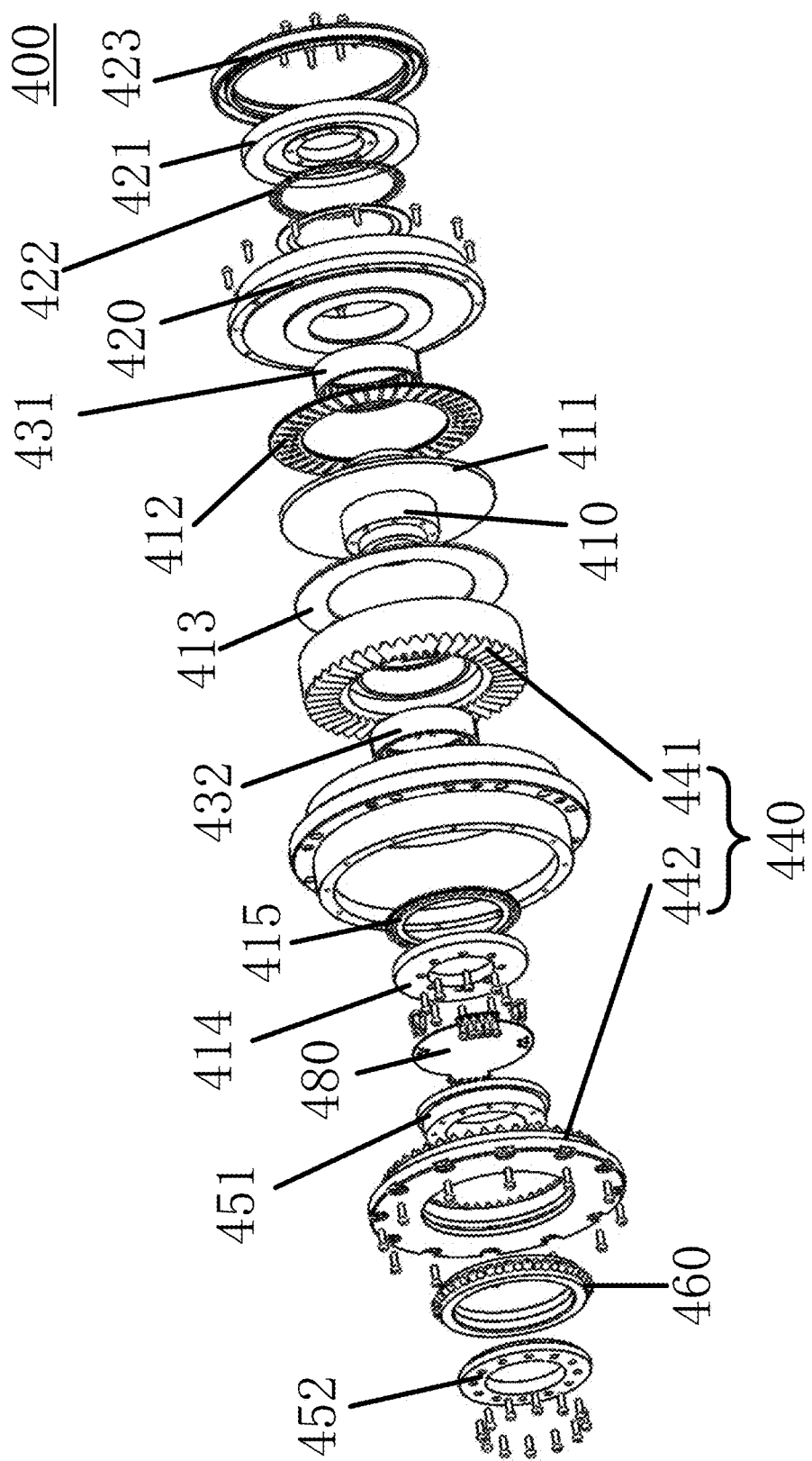

Please refer to FIGS. 8A and 8B, wherein FIG. 8A illustrates a sectional view of a nutation deceleration device 400 according to another embodiment of the invention, and FIG. 8B illustrates an exploded view of the nutation deceleration device 400.

The nutation deceleration device 400 is similar with the nutation deceleration device 300 illustrated in FIGS. 7A and 7B, and a nutation gear 441 is coupled to output axes 451 and 452 via a torque transfer component 480 to transfer a torque of the nutation gear 441 to the output shaft. An internal circumference of a non-nutation gear 442 is coupled to the output shaft via a bearing 460, such that the output shaft may rotate independent from the non-nutation gear 442, and an external circumference of the non-nutation gear 442 is fixed to a shell 420. Therefore, the nutation gear 441 performs nutation motion, and further rotates relative to the non-nutation gear 442 at output rotation speed, and the output rotation is transferred to the output shafts 451 and 452 through the torque transfer component 480.

An input shaft 410 in the nutation deceleration device 400 further has a flange 411 radially extending from an external circumference of the input shaft 410 outwardly, and the flange 411 has a first thickness and a second thickness less than the first thickness. Moreover, the thickness of the flange 411 is decreased from the first thickness to the second thickness along a circumferential direction of the input shaft 410, and then increased from the second thickness to the first thickness. For example, the flange 411 has the first thickness at a position of 0° of the input shaft 410, and the thickness of the flange 411 is decreased from the first thickness to the second thickness between 0° and 180°, and then increased from the second thickness to the first thickness between 180° and 360° (i.e., 0°).

The flange 411 abuts against the shell 420 on a lateral surface far away from the nutation gear 441 through a needle roller thrust bearing 413, and abuts against one side of the nutation gear 441 that is not provided with the tooth flank on a lateral surface adjacent to the nutation gear 441 through a needle roller thrust bearing 412. The external circumference of the input shaft 410 is coupled to internal circumferences of the shell 420 and the nutation gear 441 via needle bearings 431 and 432, respectively. The input shaft 410 may rotate independent from the shell 420 and the nutation gear 441 due to the needle roller thrust bearings 412, 413 and the needle bearings 431, 432.

The nutation deceleration device 400 has a cover plate 414 fixed to the input shaft 410 (such as, through screws), and the cover plate 414 abuts against one side of the nutation gear 441 that is provided with a tooth flank through a needle roller thrust bearing 415, such that the nutation gear 441 is sandwiched between the flange 411 and the cover plate 414 through the needle roller thrust bearings 415 and 412. As shown in FIG. 8A, the nutation gear 441 always abuts against one side of the flange 411 through the needle roller thrust bearings 415 and 412, and since the flange 411 has a thickness varied between the first thickness and the second thickness, a center axis of the nutation gear 441 is arranged obliquely relative to an axis of the input shaft 410, such that the nutation gear 441 may perform nutation motion when driven by the input shaft 410.

Alternatively or additionally, the nutation deceleration device 400 may further has a cover plate 421, and the cover plate 421 is attached to the shell 420 via a needle bearing 422, and fixed to one side of an input shaft 420 far away from the nutation gear 441 (such as, through screws), such that the cover plate 421 may limit the input shaft within the shell 420. A sealing ring 423 seals an outer periphery of the cover plate 421 and the shell 420.

Figure 9A:
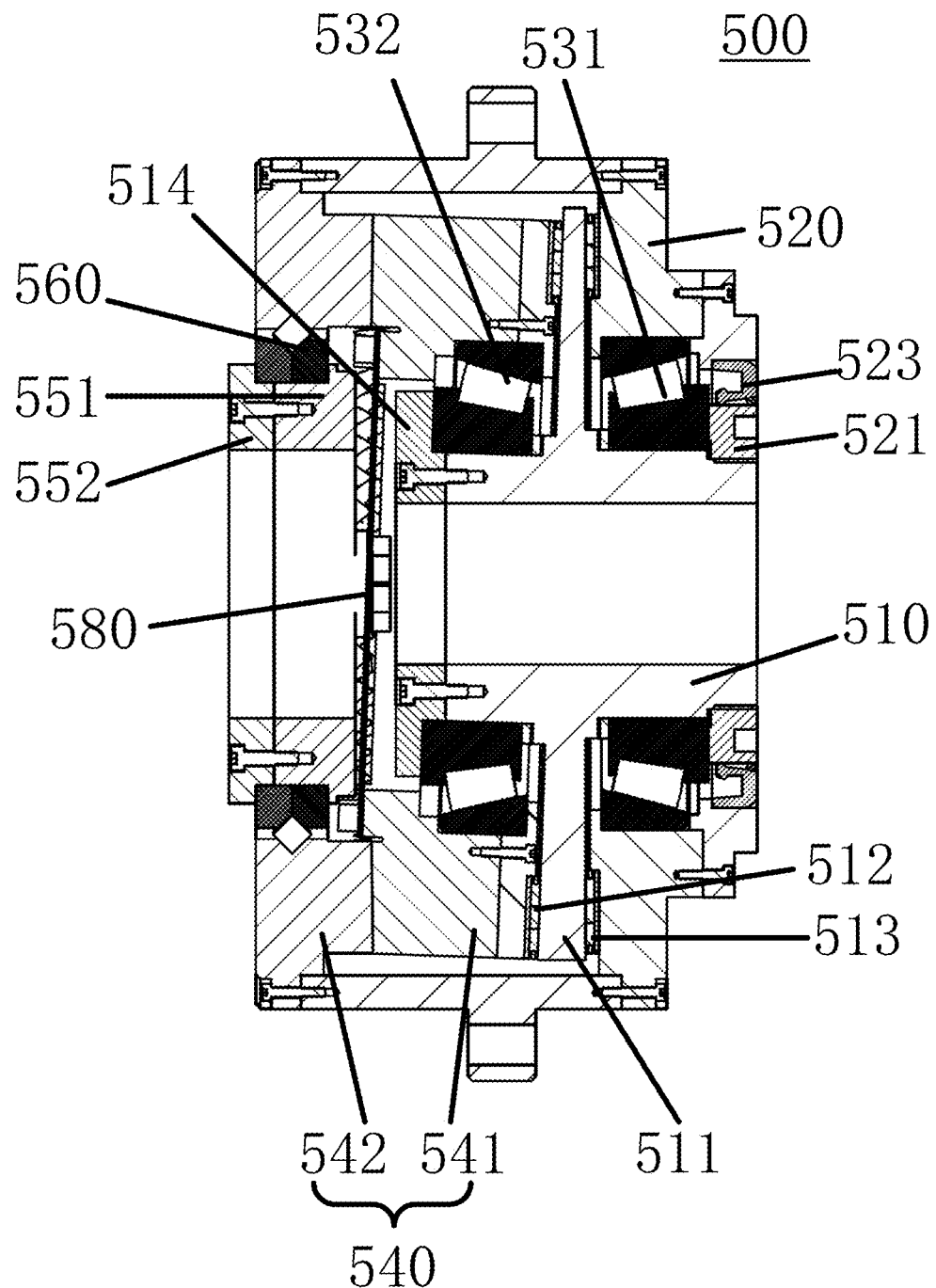
FIGS. 9A and 9B illustrate schematic diagrams of a nutation deceleration device according to another embodiment of the invention.
Figure 9B:
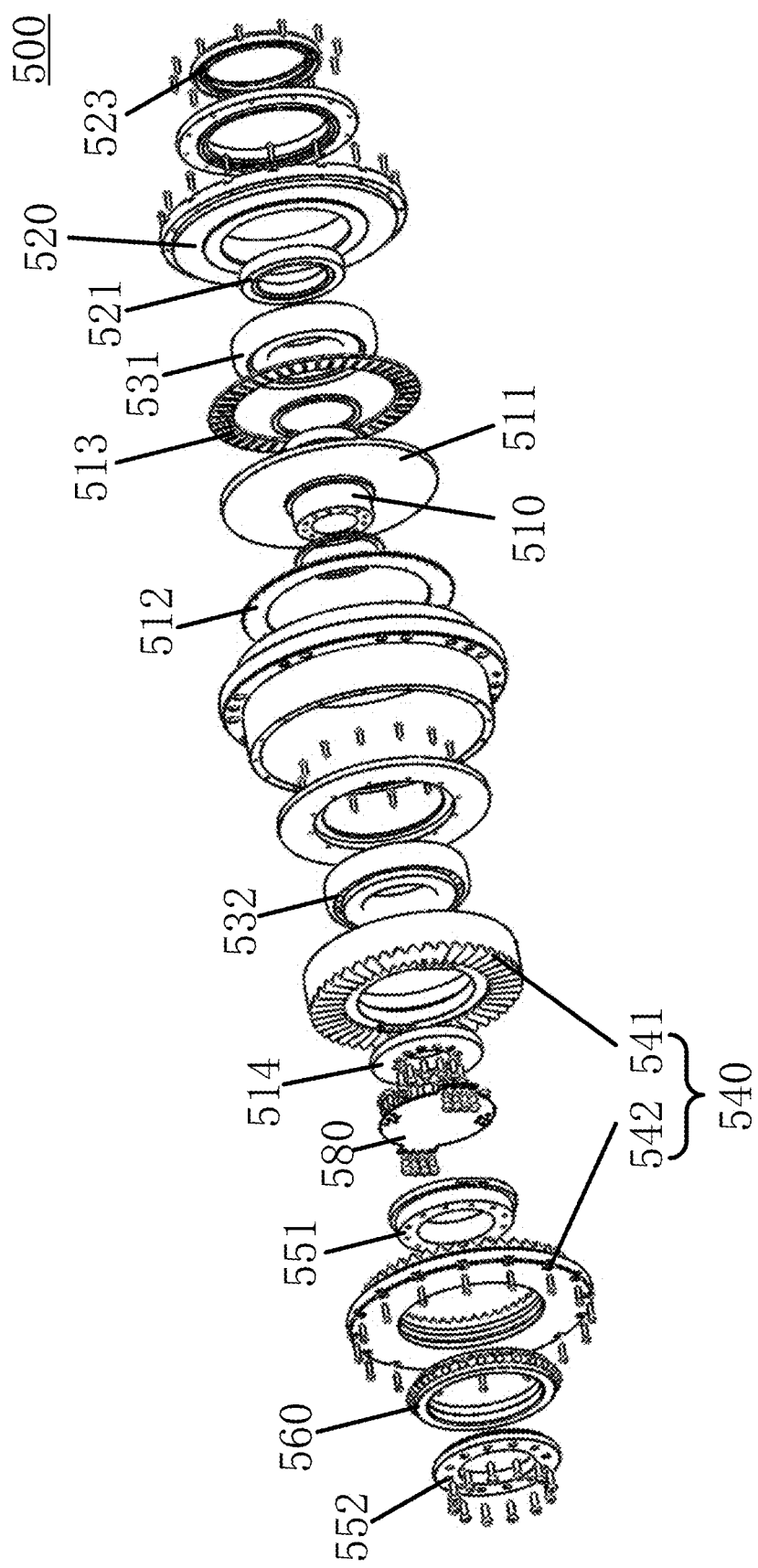

Please refer to FIGS. 9A and 9B, wherein FIG. 9A illustrates a sectional view of a nutation deceleration device 500 according to another embodiment of the invention, and FIG. 9B illustrates an exploded view of the nutation deceleration device 500.

The nutation deceleration device 500 is similar with the nutation deceleration device 400 illustrated in FIGS. 8A and 8B, and only differences therebetween are described. The nutation deceleration device 500 has conical roller bearings 531 and 532 configured such that internal circumferences and lateral sides of the conical roller bearings may cooperate together to move independent from external circumferences. For example, as shown in FIG. 9A, a cover plate 521 and an input shaft 510 are coupled by screws. The internal circumference of the conical roller bearing 531 is attached to the input shaft 510, the external circumference is attached to the shell 520, and the lateral side is attached to the cover plate 521. The input shaft 510 and the cover plate 521 may rotate relative to the shell 520 through the conical roller bearing 531 without being affected by the shell 520, so the conical roller bearing 531 may function as the needle bearings 422 and 431 in the nutation deceleration device 400 of FIGS. 8A and 8B simultaneously. Similarly, in FIG. 8, the input shaft 510 and a cover plate 514 are coupled by screws. The internal circumference of the conical roller bearing 532 is attached to the input shaft 510, the external circumference is attached to an internal circumference of a nutation gear 541, and the lateral side is attached to the cover plate 514. The input shaft 510 and the cover plate 514 may rotate relative to the nutation gear 541 through the conical roller bearing 532 without affecting motion of the nutation gear 541, so the conical roller bearing 532 may function as the needle bearings 432 and 415 in the nutation deceleration device 400 of FIGS. 8A and 8B simultaneously. In some embodiments, conical roller bearings having flanges can replace the conical roller bearings 531 and 532 in the nutation deceleration device 500. Other components of the nutation deceleration device 500 are the same as that of the nutation deceleration device 400, and details are not described here.

Figure 10:
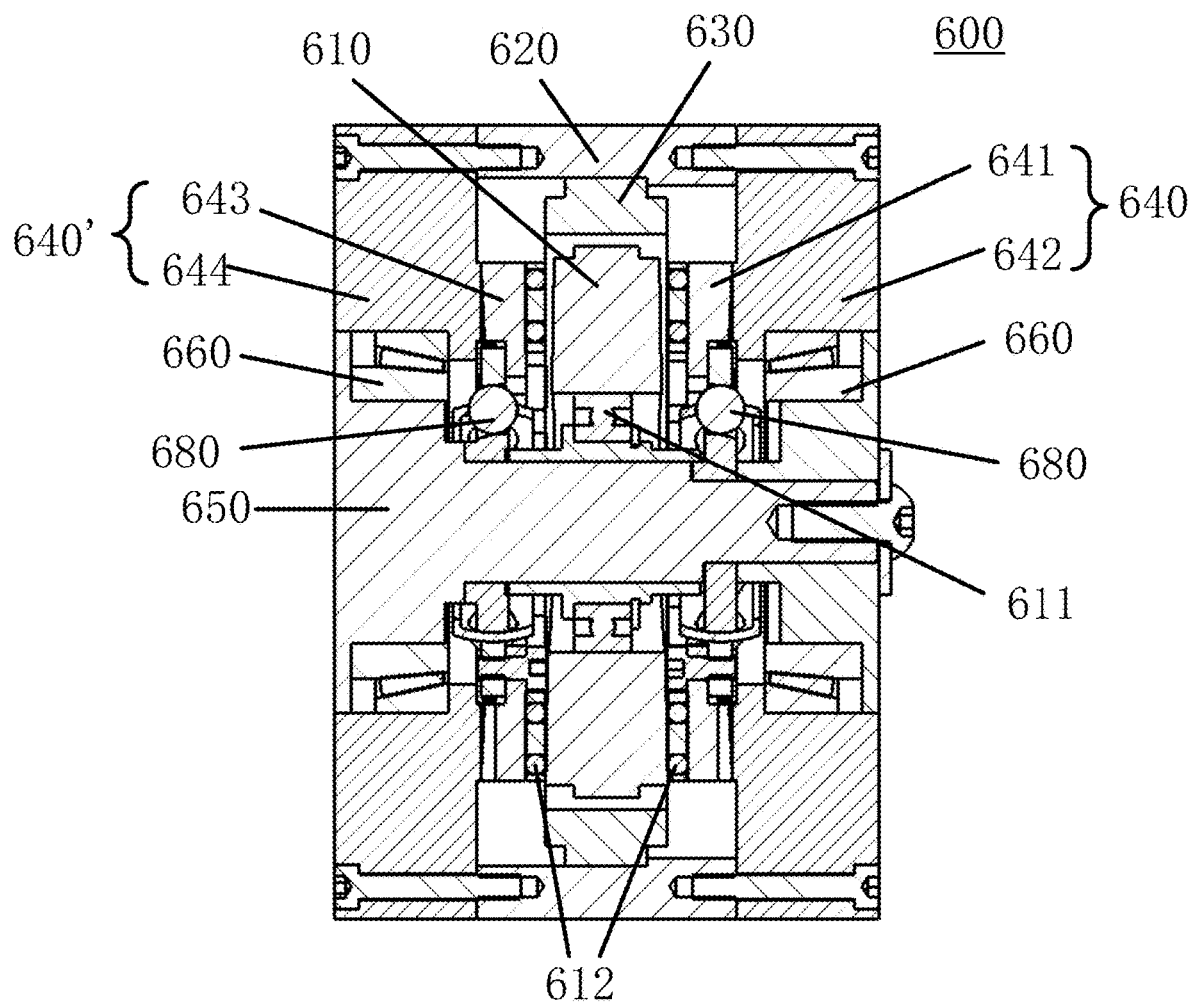
FIG. 10 illustrates a schematic diagram of a nutation deceleration device according to another embodiment of the invention.

Please continue to refer to FIG. 10, which illustrates a sectional view of a nutation deceleration device 600 according to another embodiment of the invention. A nutation speed reducer 600 is similar with the nutation speed reducer 300 in FIG. 7A and the nutation speed reducer 400 in FIG. 8A, and hereinafter only differences are described.

Differences of the nutation speed reducer 600 lie in that the nutation speed reducer 600 has two cycloidal-pin gear pairs 640 and 640' described according to the embodiments. The cycloidal-pin gear pair 640 is formed of a nutation gear 641 and a non-nutation gear 642, and the cycloidal-pin gear pair 640' is formed of a nutation gear 643 and a non-nutation gear 644. The cycloidal-pin gear pair 640 is opposite to the cycloidal-pin gear pair 640'. In the nutation speed reducer 600, a motor 630 within a shell 620 is coupled to an input shaft 610 within the shell 620 to drive the input shaft 610 to rotate, two opposite lateral surfaces of the input shaft 610 are formed as inclined planes arranged symmetrically, and the two inclined planes abut against corresponding side of the nutation gears 641 and 643 that is not provided with the tooth flanks via a ball thrust bearing 612, respectively, such that the nutation gears 641 and 643 and rotational axes of the input shaft 610 (and the output shaft 650 described below) are angled at a certain angle, so when the input shaft 610 rotates by the motor 630, the lateral surfaces of the input shaft 610 urge the nutation gears 641 and 643 to perform nutation via the ball thrust bearing 612. The output shaft 650 is formed in the shell 620, and fitted into an opening formed by a center of the input shaft 610, and a bearing assembly 611 is between the output shaft 650 and the input shaft 610, such that the output shaft 650 and the input shaft 610 can rotate individually. The non-nutation gears 642 and 644 are fixed to the shell 620 via a fixed mechanism (such as, screws). Since the non-nutation gears 642 and 644 are fixed to the shell 620, when the non-nutation gear 642 and the nutation gear 641, and the non-nutation gear 644 and the nutation gear 643 perform meshing transmission, the non-nutation gears 642 and 644 do not rotate, so the nutation gears 641 and 643 are driven to slowly rotate at a decelerated rotational speed. The nutation gears 641 and 643 are coupled to the output shaft 650 through a torque transfer component 680, such that the nutation gears 641 and 643 together drive the output shaft 650 to rotate. The output shaft 650 and the non-nutation gears 642 and 644 are further provided with a bearing assembly 660. Therefore, the fixed non-nutation gears 642 and 644 do not affect rotation of the output shaft 650. The cycloidal-pin gear pairs 640 and 640' have the same design of tooth flanks and a deceleration ratio. Transmission efficiency of the nutation speed reducer can be improved, and energy loss can be reduced by disposing one additional cycloidal-pin gear pair in the nutation decelerator. In other embodiments combinable with this embodiment, two or more cycloidal-pin gear pairs can be further disposed in the nutation decelerator, as along as these cycloidal-pin gear pairs have the same design of tooth flanks, and input rotation is decelerated at the same ratio in the case of the same drive and input.

The nutation speed reducer having the cycloidal-pin gear pairs described in the invention can be used in various applications.

Figure 11:
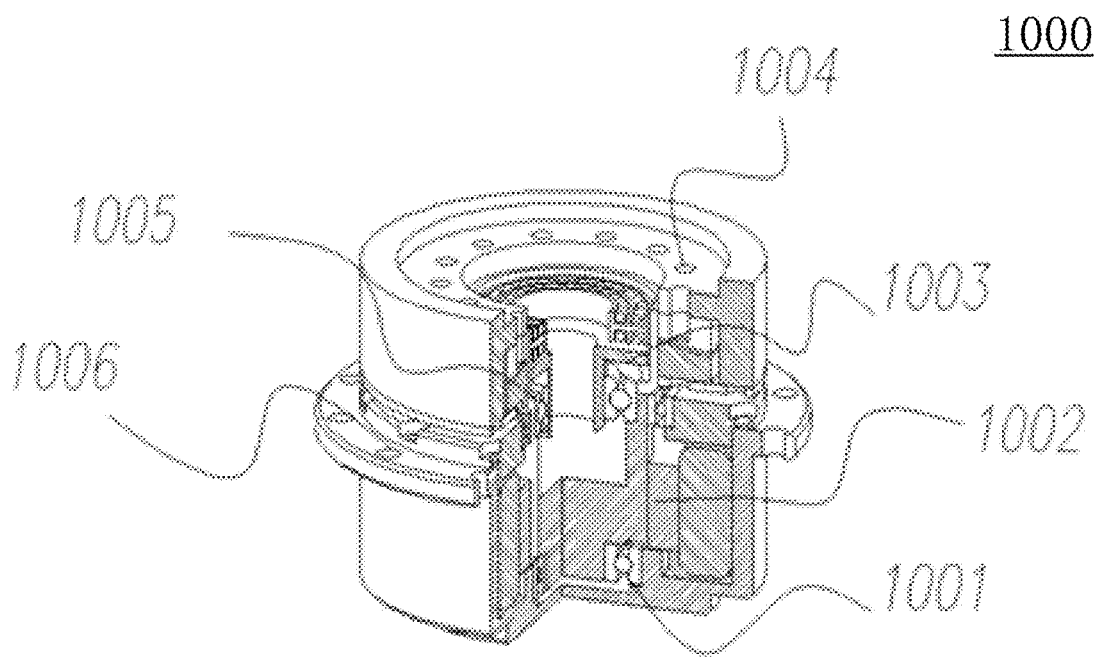
FIG. 11 illustrates a structural diagram of a joint for a robot according to one embodiment of the invention.

For example, FIG. 11 illustrates a structural diagram of a joint 1000 for a robot according to one embodiment of the invention.

The joint 1000 can be applied to various types of robots, such as, a series robot, a parallel robot, a planar robot, and the like. The joint 1000 comprises an shell 1001, a nutation speed reducer 1003 disposed in the shell 1001, a servo motor 1002 and an output mechanism 1004. The nutation speed reducer 1003 can be any one of the nutation speed reducers 200, 300, 400, 500 and 600 described above. An input shaft of the nutation speed reducer 1003 is coupled to the servo motor 1002, and an output shaft of the nutation speed reducer 1003 is coupled to the output mechanism 1004. When the servo motor 1002 is powered, a speed of a rotor of the motor is decelerated through the nutation speed reducer 1003, and outputted at an increased torque.

Figure 12:
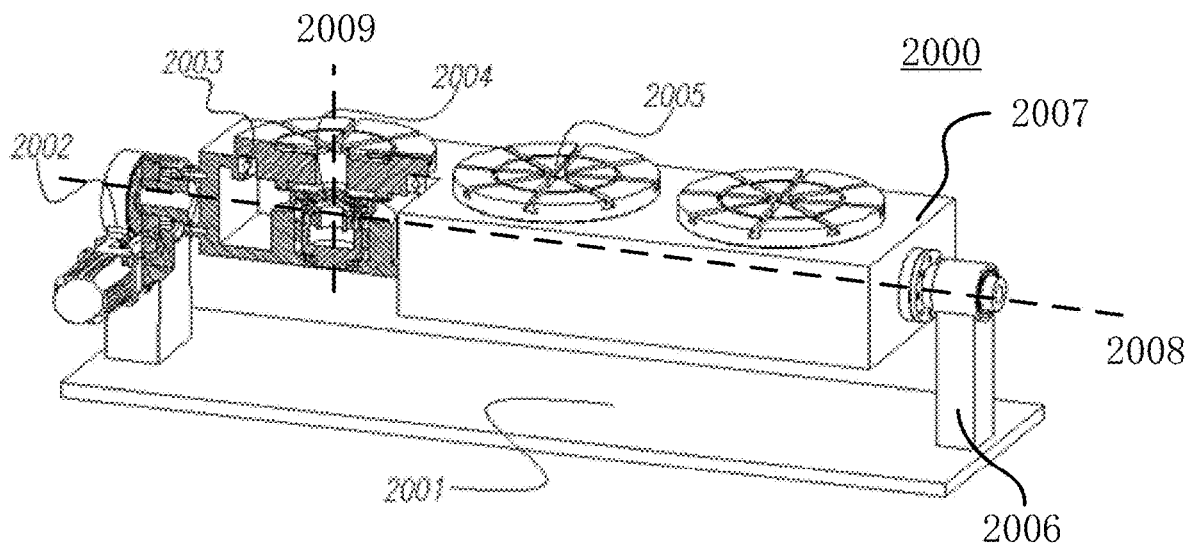
FIG. 12 illustrates a structural diagram of a double swing angle operating table for a machine tool according to one embodiment of the invention.

FIG. 12 illustrates a structural diagram of a double swing angle operating table 2000 for a machine tool according to one embodiment of the invention.

The double swing angle operating table 2000 can be a turn-milling composite double swing angle operating table. The double swing angle operating table 2000 comprises a bottom base 2001, and stand columns 2006 formed on both sides of the bottom base 2001. A rotary table shell 2007 is set up on the two stand columns 2006. The double swing angle operating table 2000 comprises a motor 2002 (a turbine worm geared motor), and the rotary table shell 2007 rotates about a first axis 2008 via the motor 2002, thereby swinging in a first degree of freedom. The rotary table shell 2007 is formed with at least one opening, and at least one operating table 2004 passes through the opening, and is disposed in the rotary table shell 2007. The rotary table shell 2007 comprises a nutation decelerator 2004 corresponding to each operating table 2004. The nutation decelerator 2004 can be any one of the nutation decelerators 200, 300, 400, 500 and 600 described previously. An input shaft of the nutation decelerator 2004 is coupled to the motor (such as, the servo motor) (not shown), and an output shaft of the nutation decelerator 2004 is coupled to the operating table 2004 to drive the operating table 2004 to rotate about a second axis 2009 perpendicular to the first axis 2008, thereby swinging in a second degree of freedom. An outer periphery of the operating table 2004 is fixed to the opening of the rotary table shell 2007 via a bearing 2003. The nutation decelerator 2004 provides an output with a decelerated speed and an increased torque, which can be adapted to mass machining simultaneously and machining a plurality of surfaces of parts that are complex and have a high precision.

Figure 13:
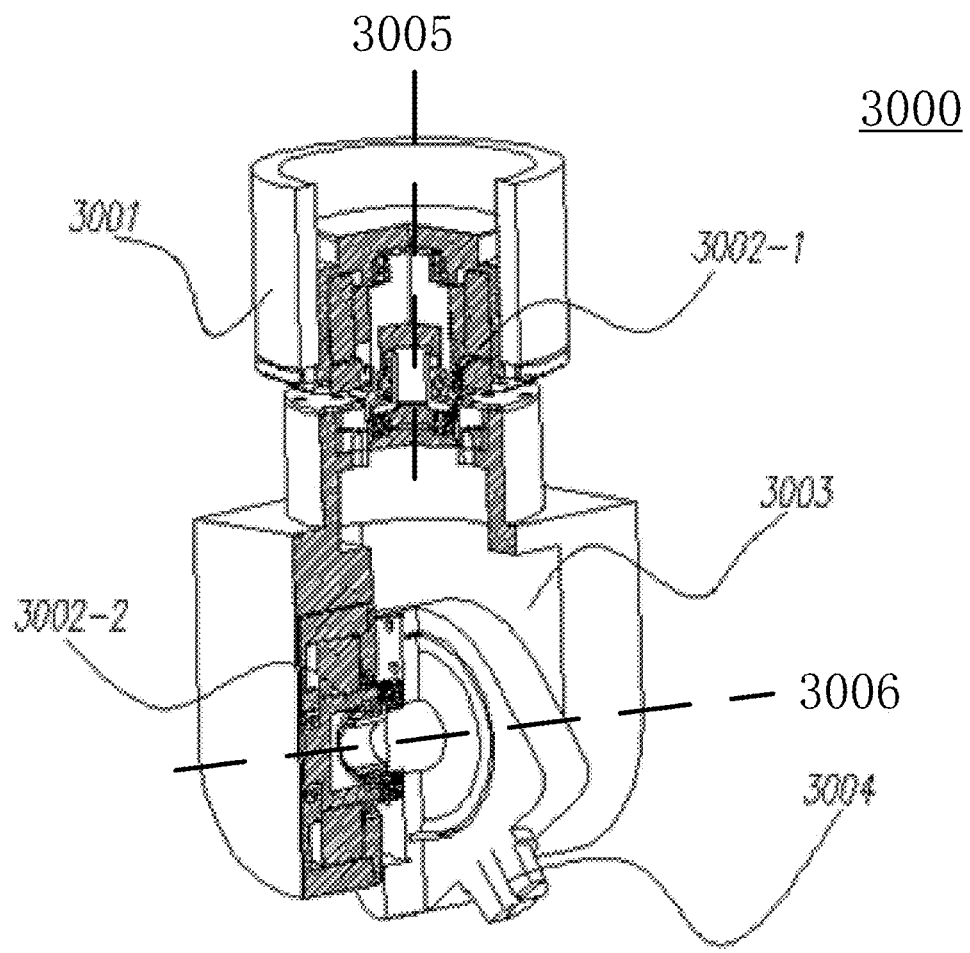
FIG. 13 illustrates a structural diagram of a double swing angle milling head for a machine tool according to one embodiment of the invention.

FIG. 13 illustrates a structural diagram of a double swing angle milling head 3000 for a machine tool according to one embodiment of the invention.

The double swing angle milling head 3000 may be applied to a CNC machine tool. The double swing angle milling head 3000 comprises shells 3001 and 3003 rotatably coupled to each other. A nutation decelerator 3002-1 is disposed in the shell 3001, an input shaft of the nutation decelerator 3002-1 is coupled to a motor (such as, a servo motor) (not shown), and an output shaft of the nutation decelerator 3002-1 is coupled to the shell 3003, thereby driving the shell 3003 to rotate about a first axis 3005 at a decelerated rotational speed and an increased torque, and swinging in a first degree of freedom. A milling head 3004 is disposed in the shell 3003, and extends from an opening formed on a lateral surface of the shell 3003 for milling operation. A nutation decelerator 3002-2 is disposed in the shell 3003, an input shaft of the nutation decelerator 3002-2 is coupled to the motor (such as, the servo motor) (not shown), and an output shaft of the nutation decelerator 3002-2 is coupled to the milling head 3004, thereby driving the milling head 3004 to rotate about a second axis 3006 different from the first axis 3005 at a decelerated rotational speed and an increased torque, and swinging in a second degree of freedom. The first axis 3005 can be perpendicular to the second axis 3006. The nutation decelerators 3002-1 and 3002-2 can be any one of the nutation decelerators 200, 300, 400, 500 and 600 described above.

Figure 14:
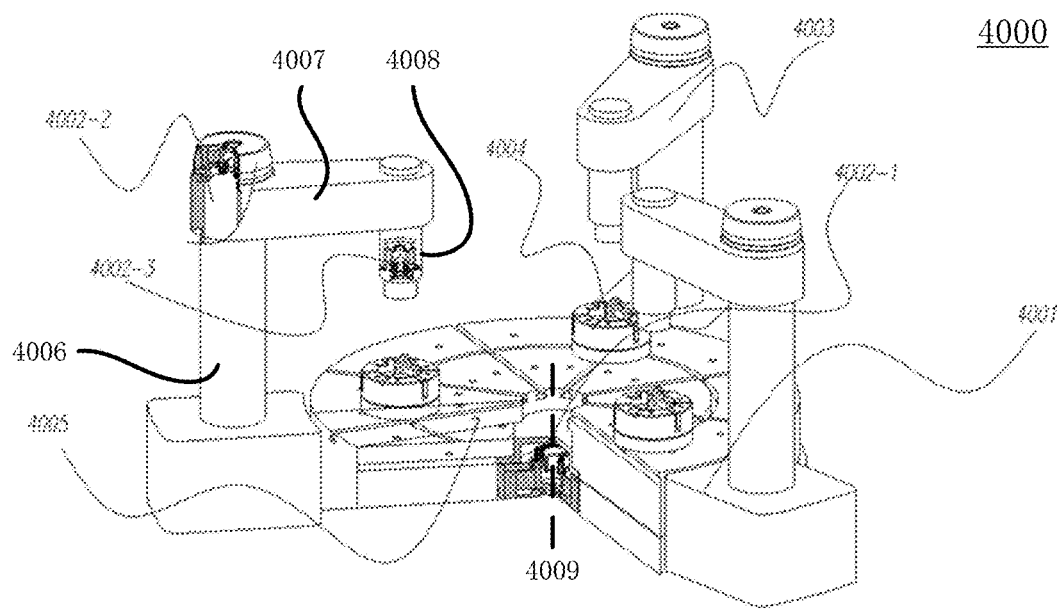
FIG. 14 illustrates a structural diagram of an indexing rotary table for a CNC machine tool according to one embodiment of the invention.

FIG. 14 illustrates a structural diagram of an indexing rotary table 4000 for a CNC machine tool according to one embodiment of the invention.

The indexing rotary table 4000 comprises a rotary table body 4005 and a plurality of operating arms 4001 disposed along an outer periphery of the rotary table body 4005. A nutation decelerator 4002-1 is formed in the rotary table body 4005, an input shaft of the nutation decelerator 4002-1 is coupled to a motor (such as, a servo motor) (not shown), and an output shaft of the nutation decelerator 4002-1 is coupled to the rotary table body, thereby driving the rotary table body 4005 to rotate about an axis 4009 at a slowed speed and an increased torque. The operating arms 4001 comprise stand columns 4006, cross arms 4007 and operating heads 4008. The cross arms 4007 are between the stand columns 4006 and the operating heads 4008 for connecting the stand columns 4006 and the operating heads 4008. A nutation decelerator 4002-2 is disposed in a top of the stand column 4006, an input shaft of the nutation decelerator 4002-2 is coupled to the motor (such as, the servo motor) (not shown), and an output shaft of the nutation decelerator 4002-2 is coupled to one end of the cross arm 4007, thereby driving the cross arm 4007 to rotate about an axis parallel to the axis 4009 at a decelerated speed and an increased torque with the end as an axle center. A nutation decelerator 4002-3 is further disposed in the operating head 4008, an input shaft of the nutation decelerator 4002-3 is coupled to the motor (such as, the servo motor) (not shown), and an output shaft of the nutation decelerator 4002-3 is coupled to the operating head 4008, thereby driving the operating head 4008 to rotate about an axis parallel to the axis 4009 at a decelerated speed and an increased torque. The nutation decelerators 4002-1, 4002-2 and 4002-3 can be any one of the nutation decelerators 200, 300, 400, 500 and 600 described above. Therefore, coordinative machining of multiple processes of components and parts that are complex and have requirements for machining precision can be realized.

Figure 15:
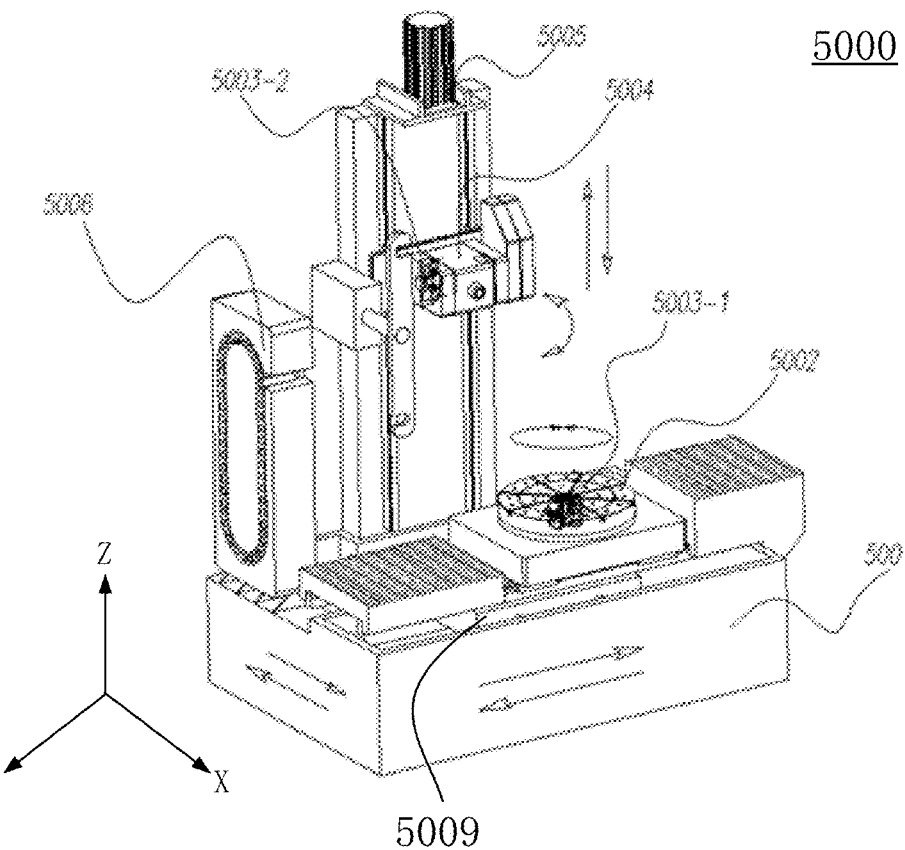
FIG. 15 illustrates a structural diagram of a CNC machine tool according to one embodiment of the invention.

FIG. 15 illustrates a structural diagram of a CNC machine tool 5000 according to one embodiment of the invention.

The CNC machine tool 5000 comprises a base 5001 and a translation device 5009 formed on the base 5001, and the translation device 5009 is configured to translate on an X-Y flat. An operating table 5002 is disposed on the translation device 5009, and the operating table 5002 can be the double swing angle operating table 2000 in FIG. 14, and has a nutation decelerator 5003-1. A lifting device 5005 is further disposed on the base 5001, and configured to move in a Z-axis direction. A milling head 5004 is disposed on the lifting device 5005, and the milling head 5004 can be the double swing angle milling head 3000 in FIG. 13, and has a nutation decelerator 5003-2. The nutation decelerators 5003-1 and 5003-2 can be any one of the nutation decelerators 200, 300, 400, 500 and 600 described above. Therefore, the operating table 5002 and the milling head 5004 can swing in two degrees of freedom, the translation device 5009 can move on the X-Y flat, and the lifting device 5005 can move in the Z-axis direction, so the CNC machine tool 5000 can at least have function of five-axis coordinative motion. The CNC machine tool 5000 also may have a tool storage system 5006.

Figure 16:
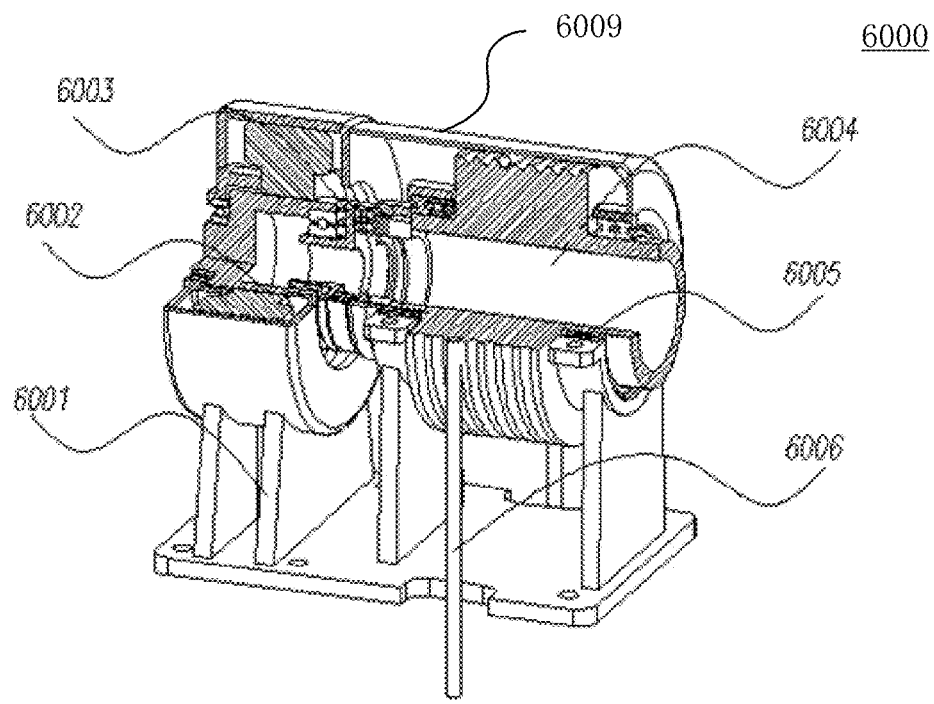
FIG. 16 illustrates a structural diagram of a traction machine according to one embodiment of the invention.

FIG. 16 illustrates a structural diagram of a traction machine 6000 according to one embodiment of the invention.

The traction machine 6000 is applied in elevators and escalators. The traction machine 6000 comprises a rack 6001. A nutation decelerator 6003, a motor 6002 and a traction wheel 6004 are supported by the rack 6001. In some embodiments, the rack 6001 comprises a segmented shell 6009 having a plurality of sections, and each of the nutation decelerator 6003, the motor 6002 and the traction wheel 6004 is disposed on the corresponding section, and fixed with the segmented shell 6009 via a bearing assembly 6005. The motor 6002 can be a servo motor. The nutation decelerator 6003 can be any one of the nutation decelerators 200, 300, 400, 500 and 600 described above. An input shaft of the nutation decelerator 6003 is coupled to the motor 6002, and an output shaft of the nutation decelerator 6003 is coupled to the traction wheel 6004 to drive the traction wheel 6004 to rotate at a decelerated rotational speed and an increased torque. A traction rope 6006 is disposed on the traction wheel 6004 for traction of personnel and materials.

Figure 17:
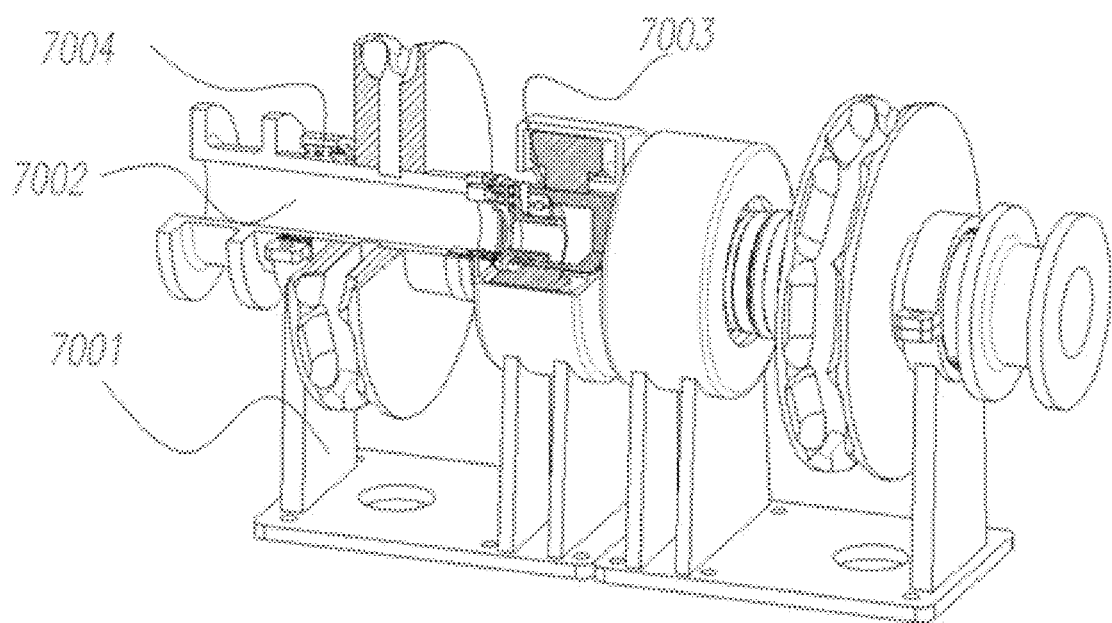
FIG. 17 illustrates a structural diagram of an anchor machine for ships according to one embodiment of the invention.

FIG. 17 illustrates a structural diagram of an anchor machine 7000 for ships according to one embodiment of the invention.

FIG. 17 illustrates two anchor machines 7000 for ships on left and right. The anchor machine 7000 comprises a base 7001. An output disk 7002 and a nutation decelerator 7004 are supported by the base 7001. The nutation decelerator 7004 can be any one of the nutation decelerators 200, 300, 400, 500 and 600 described above. An input shaft of the nutation decelerator 7004 is coupled to a motor (such as, a servo motor) (not shown), and an output shaft of the nutation decelerator 7004 is coupled to the output disk 7002 to drive the output disk 7002 to rotate at a decelerated rotational speed and an increased torque for traction of ships. The output disk 7002 and the nutation decelerator 7004 are fixed to the base 7001 through a bearing 7004.

Figure 18:
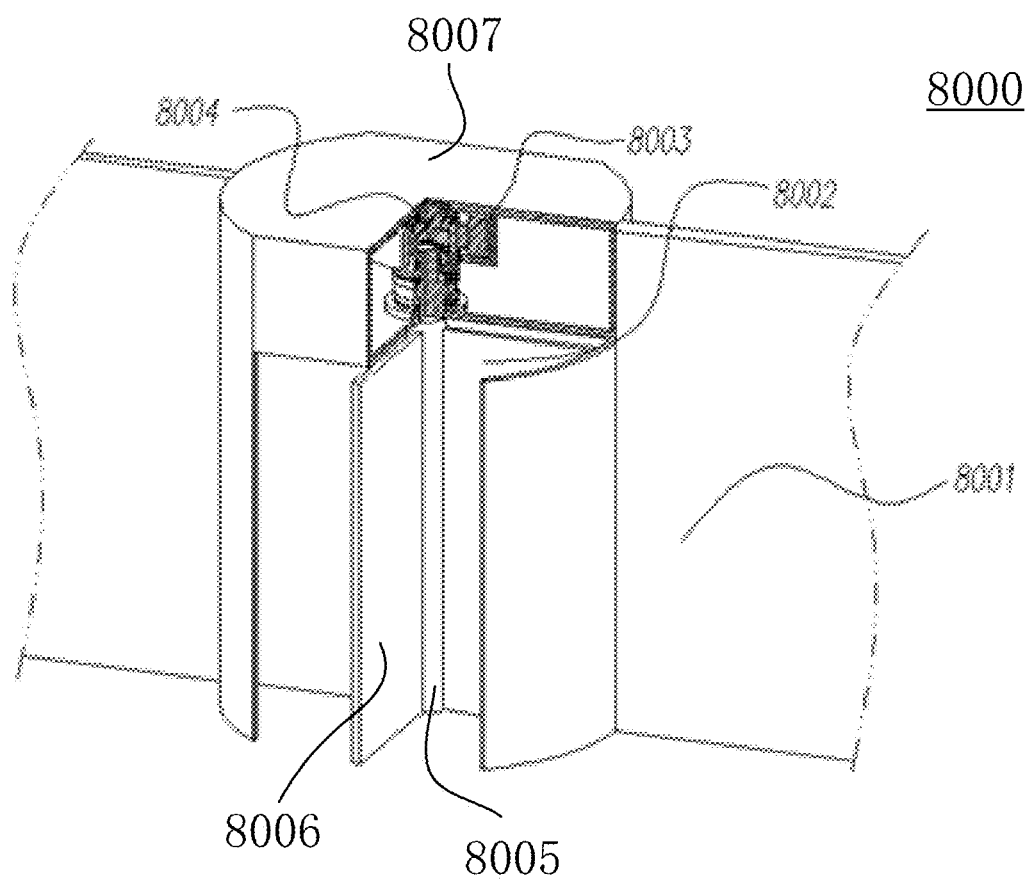
FIG. 18 illustrates a structural diagram of a revolving door according to one embodiment of the invention.

FIG. 18 illustrates a structural diagram of a revolving door 8000 according to one embodiment of the invention.

The revolving door 8000 may be applied to public places, and mounted on a wall 8001. The revolving door 8000 comprises a rotating door 8002 comprising a stand column 8005 and a plurality of door bodies 8006 radially extending from the stand column 8005 outwardly. A rotating mechanism is disposed on a top of the rotating door 8002 to drive the rotating door 8002 to rotate. The rotating mechanism comprises a shell 8007 and a nutation decelerator 8003 disposed in the shell 8007. The nutation decelerator 8003 can be any one of the nutation decelerators 200, 300, 400, 500 and 600 described above. An input shaft of the nutation decelerator 8003 is coupled to a motor 8004 (such as, a servo motor) (not shown), and an output shaft of the nutation decelerator 8003 is coupled to the stand column 8005 to drive the rotating door 8002 to rotate at a decelerated rotational speed and an increased torque.

Figure 19:
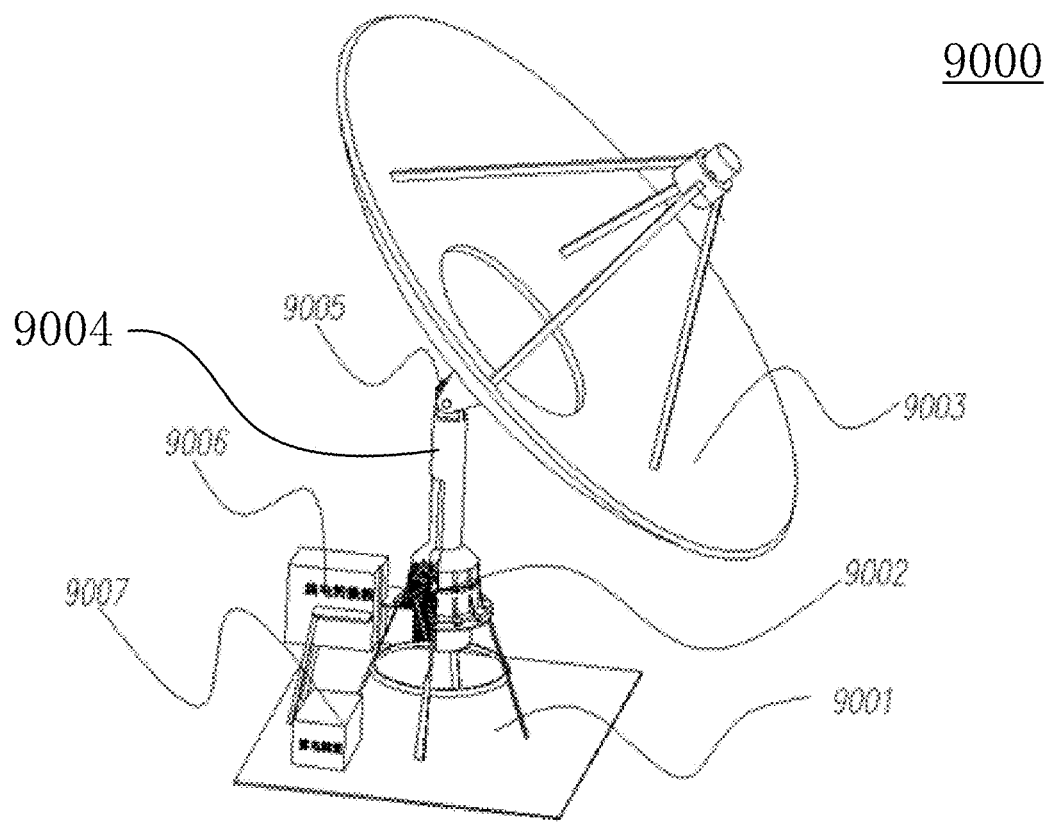
FIG. 19 illustrates a structural diagram of a solar power conversion device according to one embodiment of the invention.

FIG. 19 illustrates a structural diagram of a solar power conversion device 9000 according to one embodiment of the invention.

As shown in FIG. 19, the solar power conversion device 9000 comprises a base 9001. A supporting pole 9004 is supported on the base 9001. The supporting pole 9004 is supported by a nutation decelerator 9002 on the base 9001. The nutation decelerator 9002 can be any one of the nutation decelerators 200, 300, 400, 500 and 600 described above. An input shaft of the nutation decelerator 9002 is coupled to a motor (such as, a servo motor) (not shown), and an output shaft of the nutation decelerator 9002 is coupled to the supporting pole 9004 to drive the supporting pole 9004 to rotate about a center axis of the supporting pole 9004 at a decelerated rotational speed and an increased torque. A collection device 9003 is configured to collect heat energy from sun, and coupled to a top of the supporting pole 9004 by a swing motor 9005, such that the collection device 9003 swings and pitches when driven by the swing motor 9005. In some embodiments, the swing motor 9005 also can be provided with any one of the nutation decelerators 200, 300, 400, 500 and 600 described above, thereby driving the collection device 9003 to swing and pitch at an increased torque. In some embodiments, a heat energy conversion device 9006 coupled to the collection device 9003 and an energy storage device 9007 coupled to the heat energy conversion device 9006 are disposed on the base 9001.

Figure 20:
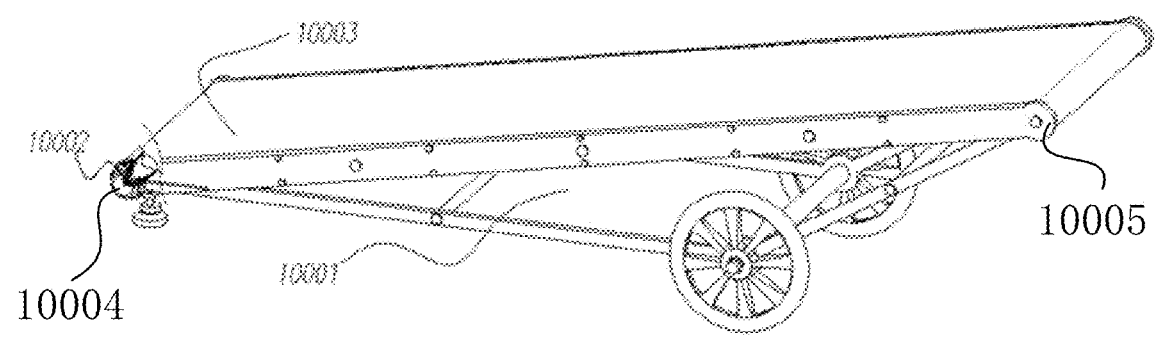
FIG. 20 illustrates a structural diagram of a material transport device according to one embodiment of the invention.

FIG. 20 illustrates a structural diagram of a material transport device 10000 according to one embodiment of the invention.

As shown in FIG. 20, the material transport device 10000 comprises a bracket 10001. A plurality of rollers 10004 and 10005 are disposed on the bracket 10001. A conveyor belt 10003 is provided on the rollers 10004 and 10005, thereby driving the conveyor belt 10003 to transport goods placed on the conveyor belt 10003 along with rotation of the rollers 10004 and 10005. Although FIG. 20 only illustrates two rollers on both sides of the bracket 10001, more rollers also can be disposed, such as, at positions between the rollers 10004 and 10005. The material transport device 10000 further comprises a nutation decelerator 10002, and the nutation decelerator 10002 can be any one of the nutation decelerators 200, 300, 400, 500 and 600 described above. An input shaft of the nutation decelerator 10002 is coupled to a motor (such as, a servo motor) (not shown), and an output shaft of the nutation decelerator 10002 is coupled to the roller 10004 to drive the roller 10004 to rotate about a center axis of the roller 10004 at a decelerated rotational speed and an increased torque, and driving the conveyor belt 10003 to run. In some embodiments, each of the rollers can have respective nutation decelerators, the input axes of these nutation decelerators together are coupled to the motor, and the output axes are coupled to the respective rollers, thereby operating simultaneously to further increase a torque transferred to the conveyor belt 10003, and transport heavy goods.

The nutation decelerator having the cycloidal-pin gear pair described in the invention can be used in various applications, such as, searchlights, laser transmitter artillery, missile launchers, turning and pitching devices of some special vehicles, and also can be applied to steering engines of missile and submarines and yawing mechanisms of airplanes. The embodiments of the invention are described in the foregoing disclosures. Other and further embodiments of the invention can be modified without departing from extent of protection, and the extent of protection is determined by the appended claims.

What is claimed is:

1. A transverse cycloidal-pin gear pair for a nutation deceleration device, comprising:
   a cycloidal gear having a cycloidal tooth flank, wherein a reference surface of the cycloidal gear and an axis of the cycloidal gear are angled at a first angle; and
   a pin gear meshing with the cycloidal gear in a nutation transmission manner and having a pin tooth flank, wherein a reference surface of the pin gear and an axis of the pin gear are angled at a second angle; wherein,
   the first angle and the second angle are both between 88° and 91°, and a sum of the first angle and the second angle is less than 180°, and
   wherein portions of the pin tooth flank and the cycloidal tooth flank meshing therewith are pin gear working flank and cycloidal gear working flank, respectively, and a pressure angle between the pin gear working flank and the cycloidal gear working flank when meshing satisfies the following relationship:

$$45°-\beta-5°\leq\alpha\leq45°-\beta+5°,$$

where $\alpha$ is the pressure angle, and $\beta$ is a friction angle between the pin gear working flank and the cycloidal gear working flank.

2. The transverse cycloidal-pin gear pair according to claim 1, wherein the pin gear working flank is a conical surface, a cone tip of the pin gear working flank is located at a center point of the reference surface of the pin tooth flank, and an axis of the pin gear working flank is on the reference surface of the pin tooth flank.

3. The transverse cycloidal-pin gear pair according to claim 2, wherein the cycloidal gear working flank is an envelope of the pin gear working flank.

4. The transverse cycloidal-pin gear pair according to claim 1, wherein,
   the pin tooth flank further includes a pin gear non-working flank consisting of a flat surface and a conical surface, and the pin gear non-working flank is tangent to the pin gear working flank; and/or
   the cycloidal tooth flank further includes a cycloidal gear non-working flank consisting of a flat surface and a conical surface, and the cycloidal gear non-working flank is tangent to the cycloidal gear working flank.

5. A nutation deceleration device, comprising:
   a shell;
   an transverse cycloidal-pin gear pair disposed in the shell;
   an input mechanism for driving the transverse cycloidal-pin gear pair to cause nutation motion of the transverse cycloidal-pin gear pair;
   an output mechanism coupled to the transverse cycloidal-pin gear pair; and
   a torque transfer component for transferring a torque of the transverse cycloidal-pin gear pair to the shell, wherein
   the transverse cycloidal-pin gear pair comprising:
      a cycloidal gear having a cycloidal tooth flank, a reference surface of the cycloidal gear and an axis of the cycloidal gear are angled at a first angle; and
      a pin gear meshing with the cycloidal gear in a nutation transmission manner and having a pin tooth flank, wherein a reference surface of the pin gear and an axis of the pin gear are angled at a second angle; and
      the first angle and the second angle are both between 88° and 91°, and a sum of the first angle and the second angle is less than 180°,
   wherein portions of the pin tooth flank and the cycloidal tooth flank meshing therewith are pin gear working flank and cycloidal gear working flank, respectively, and a pressure angle between the pin gear working flank and the cycloidal gear working flank when meshing satisfies the following relationship:

$$45°-\beta-5°\leq\alpha\leq45°-\beta+5°,$$

where α is the pressure angle, and β is a friction angle between the pin gear working flank and the cycloidal gear working flank.

6. The nutation deceleration device according to claim 5, wherein,
one of the cycloidal gear and the pin gear is a nutation gear and the other one of the cycloidal gear and the pin gear is a non-nutation gear;
the input mechanism is configured to drive the nutation gear in the transverse cycloidal-pin gear pair, and a rotational axis of the input mechanism and an axis of the nutation gear are angled at an angle;
the torque transfer component is coupled between the nutation gear and the shell to constrain the nutation gear to rotate about its axis; and
the output mechanism is coupled to the non-nutation gear.

7. A nutation deceleration device, comprising:
a shell;
an transverse cycloidal-pin gear pair disposed in the shell;
an input mechanism for driving the transverse cycloidal-pin gear pair to cause a nutation motion of the transverse cycloidal-pin gear pair;
an output mechanism coupled to the transverse cycloidal-pin gear pair; and
a torque transfer component for transferring a torque of the transverse cycloidal-pin gear pair to the output mechanism, wherein
the transverse cycloidal-pin gear pair comprising:
a cycloidal gear having a cycloidal tooth flank, a reference surface of the cycloidal gear and an axis of the cycloidal gear are angled at a first angle; and
a pin gear meshing with the cycloidal gear in a nutation transmission manner and having a pin tooth flank, wherein a reference surface of the pin gear and an axis of the pin gear are angled at a second angle; and
the first angle and the second angle are both between 88° and 91°, and a sum of the first angle and the second angle is less than 180°,
wherein portions of the pin tooth flank and the cycloidal tooth flank meshing therewith are pin gear working flank and cycloidal gear working flank, respectively, and a pressure angle between the pin gear working flank and the cycloidal gear working flank when meshing satisfies the following relationship:

$$45°-\beta-5°\leq\alpha\leq45°-\beta+5°,$$

where α is the pressure angle, and β is a friction angle between the pin gear working flank and the cycloidal gear working flank.

8. The nutation deceleration device according to claim 7, wherein,
one of the cycloidal gear and the pin gear is a nutation gear and the other one of the cycloidal gear and the pin gear is a non-nutation gear;
the input mechanism is configured to drive the nutation gear in the transverse cycloidal-pin gear pair, and a rotational axis of the input mechanism and an axis of the nutation gear are angled at an angle;
the non-nutation gear in the transverse cycloidal-pin gear pair is fixed to the shell; and
the output mechanism is coupled to the nutation gear via the torque transfer component.

9. The nutation deceleration device according to claim 8, further comprising:
a second transverse cycloidal-pin gear pair disposed in the shell, and is opposite to the transverse cycloidal-pin gear pair, and the second transverse cycloidal-pin gear pair has a same configuration of that of the transverse cycloidal-pin gear pair; wherein,
the input mechanism is configured to drive a nutation gear in the second transverse cycloidal-pin gear pair, and the rotational axis of the input mechanism and the axis of the nutation gear of the second transverse cycloidal-pin gear pair are angled at the angle;
a non-nutation gear in the second transverse cycloidal-pin gear pair is fixed to the shell; and
the output mechanism is coupled to the nutation gear of the second transverse cycloidal-pin gear pair via the torque transfer component.

10. The nutation deceleration device according to claim 8, wherein the input mechanism has a nutation step formed by being recessed into a sidewall of the input mechanism, wherein,
the nutation step is located at a position where the input shaft is coupled with the nutation gear via a bearing, and
a step surface of the nutation step and the rotational axis of the input mechanism are angled at the angle.

11. The nutation deceleration device according to claim 8, wherein a sidewall of an input shaft of the input mechanism is provided with a flange radially extending outwardly, and the flange has a thickness in a direction of the rotational axis of the input mechanism; wherein,
the thickness is linearly decreased from a first thickness to a second thickness less than the first thickness along a circumferential direction of the input shaft between 0° and 180°; and the thickness is linearly increased from the second thickness to the first thickness along the circumferential direction of the input shaft between 180° and 360°; and
one side of the nutation gear far away from tooth flank abuts against a transverse of the flange.

12. The nutation deceleration device according to claim 7, wherein the torque transfer component is a flexible component or a constant speed transmission component.

13. The nutation deceleration device according to claim 6, wherein the input mechanism has a nutation step formed by being recessed into a sidewall of the input mechanism, wherein,
the nutation step is located at a position where the input shaft is coupled with the nutation gear via a bearing, and
a step surface of the nutation step and the rotational axis of the input mechanism are angled at the angle.

14. The nutation deceleration device according to claim 6, wherein a sidewall of an input shaft of the input mechanism is provided with a flange radially extending outwardly, and the flange has a thickness in a direction of the rotational axis of the input mechanism; wherein,
the thickness is linearly decreased from a first thickness to a second thickness less than the first thickness along a circumferential direction of the input shaft between 0° and 180°; and the thickness is linearly increased from the second thickness to the first thickness along the circumferential direction of the input shaft between 180° and 360°; and
one side of the nutation gear far away from tooth flank abuts against a transverse of the flange.

15. The nutation deceleration device according to claim 5, wherein the torque transfer component is a flexible component or a constant speed transmission component.

16. The transverse cycloidal-pin gear pair according to claim 5, wherein the pin gear working flank is a conical surface, a cone tip of the pin gear working flank is located at a center point of the reference surface of the pin tooth flank, and an axis of the pin gear working flank is on the reference surface of the pin tooth flank.

17. The transverse cycloidal-pin gear pair according to claim 16, wherein the cycloidal gear working flank is an envelope of the pin gear working flank.

18. The transverse cycloidal-pin gear pair according to claim 5, wherein,
- the pin tooth flank further includes a pin gear non-working flank consisting of a flat surface and a conical surface, and the pin gear non-working flank is tangent to the pin gear working flank; and/or
- the cycloidal tooth flank further includes a cycloidal gear non-working flank consisting of a flat surface and a conical surface, and the cycloidal gear non-working flank is tangent to the cycloidal gear working flank.

19. The transverse cycloidal-pin gear pair according to claim 7, wherein the pin gear working flank is a conical surface, a cone tip of the pin gear working flank is located at a center point of the reference surface of the pin tooth flank, and an axis of the pin gear working flank is on the reference surface of the pin tooth flank.

20. The transverse cycloidal-pin gear pair according to claim 19, wherein the cycloidal gear working flank is an envelope of the pin gear working flank.

21. The transverse cycloidal-pin gear pair according to claim 7, wherein,
- the pin tooth flank further includes a pin gear non-working flank consisting of a flat surface and a conical surface, and the pin gear non-working flank is tangent to the pin gear working flank; and/or
- the cycloidal tooth flank further includes a cycloidal gear non-working flank consisting of a flat surface and a conical surface, and the cycloidal gear non-working flank is tangent to the cycloidal gear working flank.

* * * * *